(12) United States Patent
Ngo

(10) Patent No.: US 8,666,942 B2
(45) Date of Patent: *Mar. 4, 2014

(54) SYSTEMS AND METHODS FOR MANAGING SNAPSHOTS OF REPLICATED DATABASES

(75) Inventor: David Ngo, Shrewsbury, NJ (US)

(73) Assignee: CommVault Systems, Inc., Oceanport, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/523,709

(22) Filed: Jun. 14, 2012

(65) Prior Publication Data

US 2012/0317074 A1  Dec. 13, 2012

Related U.S. Application Data

(63) Continuation of application No. 12/424,115, filed on Apr. 15, 2009, now Pat. No. 8,204,859.

(60) Provisional application No. 61/121,418, filed on Dec. 10, 2008.

(51) Int. Cl.
*G06F 17/30* (2006.01)

(52) U.S. Cl.
USPC ........... 707/634; 707/638; 707/639; 707/649; 707/683; 707/684

(58) Field of Classification Search
USPC .................. 707/634, 638, 639, 649, 683, 684
See application file for complete search history.

(56) References Cited

U.S. PATENT DOCUMENTS

| 4,296,465 | A | 10/1981 | Lemak |
|---|---|---|---|
| 4,686,620 | A | 8/1987 | Ng |
| 4,995,035 | A | 2/1991 | Cole et al. |
| 5,005,122 | A | 4/1991 | Griffin et al. |
| 5,093,912 | A | 3/1992 | Dong et al. |
| 5,133,065 | A | 7/1992 | Cheffetz et al. |

(Continued)

FOREIGN PATENT DOCUMENTS

| AU | 2006331932 | 12/2006 |
|---|---|---|
| CA | 2632935 | 12/2006 |

(Continued)

OTHER PUBLICATIONS

Andrew Calvett, "SQL Server 2005 Snapshots", published Apr. 3, 2006, available at http://www.simple-talk.com/content/print.aspx?article=137.*

(Continued)

*Primary Examiner* — Rehana Perveen
*Assistant Examiner* — Scott A Waldron
(74) *Attorney, Agent, or Firm* — Knobbe, Martens, Olson & Bear, LLP

(57) ABSTRACT

Systems and methods for managing copies of database data. For instance, in one configuration, prior to the database transactions being committed on either of the source data base and the target database, a first copy of the database can be stored on a target system. Subsequent to said generating the first copy, the data transactions are committed into the target database, and a second copy of the target database is created. Then the target database can be reverted back to a state in which the target database existed at the time of said generating the first copy. The second copy can be accessed without the use of the database application.

16 Claims, 5 Drawing Sheets

(56) References Cited

U.S. PATENT DOCUMENTS

| | | |
|---|---|---|
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,263,154 A | 11/1993 | Eastridge et al. |
| 5,265,159 A | 11/1993 | Kung |
| 5,276,860 A | 1/1994 | Fortier et al. |
| 5,276,867 A | 1/1994 | Kenley et al. |
| 5,287,500 A | 2/1994 | Stoppani, Jr. |
| 5,301,351 A | 4/1994 | Jippo |
| 5,311,509 A | 5/1994 | Heddes et al. |
| 5,317,731 A | 5/1994 | Dias et al. |
| 5,321,816 A | 6/1994 | Rogan et al. |
| 5,333,315 A | 7/1994 | Saether et al. |
| 5,347,653 A | 9/1994 | Flynn et al. |
| 5,369,757 A | 11/1994 | Spiro et al. |
| 5,403,639 A | 4/1995 | Belsan et al. |
| 5,410,700 A | 4/1995 | Fecteau et al. |
| 5,448,724 A | 9/1995 | Hayashi et al. |
| 5,455,926 A | 10/1995 | Keele et al. |
| 5,487,072 A | 1/1996 | Kant |
| 5,491,810 A | 2/1996 | Allen |
| 5,495,607 A | 2/1996 | Pisello et al. |
| 5,504,873 A | 4/1996 | Martin et al. |
| 5,544,345 A | 8/1996 | Carpenter et al. |
| 5,544,347 A | 8/1996 | Yanai et al. |
| 5,546,536 A | 8/1996 | Davis et al. |
| 5,555,404 A | 9/1996 | Torbjornsen et al. |
| 5,559,957 A | 9/1996 | Balk |
| 5,559,991 A | 9/1996 | Kanfi |
| 5,598,546 A | 1/1997 | Blomgren |
| 5,604,862 A | 2/1997 | Midgely et al. |
| 5,615,392 A | 3/1997 | Harrison et al. |
| 5,619,644 A | 4/1997 | Crockett et al. |
| 5,638,509 A | 6/1997 | Dunphy et al. |
| 5,642,496 A | 6/1997 | Kanfi |
| 5,673,381 A | 9/1997 | Huai et al. |
| 5,675,511 A | 10/1997 | Prasad et al. |
| 5,677,900 A | 10/1997 | Nishida et al. |
| 5,682,513 A | 10/1997 | Candelaria et al. |
| 5,687,343 A | 11/1997 | Fecteau et al. |
| 5,689,706 A | 11/1997 | Rao et al. |
| 5,699,361 A | 12/1997 | Ding et al. |
| 5,719,786 A | 2/1998 | Nelson et al. |
| 5,720,026 A | 2/1998 | Uemura et al. |
| 5,729,743 A | 3/1998 | Squibb |
| 5,737,747 A | 4/1998 | Vishlitzky et al. |
| 5,742,792 A | 4/1998 | Yanai et al. |
| 5,751,997 A | 5/1998 | Kullick et al. |
| 5,758,359 A | 5/1998 | Saxon |
| 5,761,677 A | 6/1998 | Senator et al. |
| 5,761,734 A | 6/1998 | Pfeffer et al. |
| 5,764,972 A | 6/1998 | Crouse et al. |
| 5,765,173 A | 6/1998 | Cane et al. |
| 5,778,395 A | 7/1998 | Whiting et al. |
| 5,790,114 A | 8/1998 | Geaghan et al. |
| 5,790,828 A | 8/1998 | Jost |
| 5,805,920 A | 9/1998 | Sprenkle et al. |
| 5,812,398 A | 9/1998 | Nielsen |
| 5,813,009 A | 9/1998 | Johnson et al. |
| 5,813,017 A | 9/1998 | Morris |
| 5,829,046 A | 10/1998 | Tzelnic et al. |
| 5,860,104 A | 1/1999 | Witt et al. |
| 5,875,478 A | 2/1999 | Blumenau |
| 5,875,481 A | 2/1999 | Ashton et al. |
| 5,878,408 A | 3/1999 | Van Huben et al. |
| 5,887,134 A | 3/1999 | Ebrahim |
| 5,901,327 A | 5/1999 | Ofek |
| 5,907,621 A | 5/1999 | Bachman et al. |
| 5,907,672 A | 5/1999 | Matze et al. |
| 5,924,102 A | 7/1999 | Perks |
| 5,926,836 A | 7/1999 | Blumenau |
| 5,933,104 A | 8/1999 | Kimura |
| 5,933,601 A | 8/1999 | Fanshier et al. |
| 5,950,205 A | 9/1999 | Aviani, Jr. |
| 5,956,519 A | 9/1999 | Wise et al. |
| 5,958,005 A | 9/1999 | Thorne et al. |
| 5,970,233 A | 10/1999 | Liu et al. |
| 5,970,255 A | 10/1999 | Tran et al. |
| 5,974,563 A | 10/1999 | Beeler, Jr. |
| 5,987,478 A | 11/1999 | See et al. |
| 5,991,779 A | 11/1999 | Bejar |
| 5,995,091 A | 11/1999 | Near et al. |
| 6,003,089 A | 12/1999 | Shaffer et al. |
| 6,009,274 A | 12/1999 | Fletcher et al. |
| 6,012,090 A | 1/2000 | Chung et al. |
| 6,021,415 A | 2/2000 | Cannon et al. |
| 6,021,475 A | 2/2000 | Nguyen et al. |
| 6,023,710 A | 2/2000 | Steiner et al. |
| 6,026,414 A | 2/2000 | Anglin |
| 6,049,889 A | 4/2000 | Steely, Jr. et al. |
| 6,052,735 A | 4/2000 | Ulrich et al. |
| 6,058,066 A | 5/2000 | Norris et al. |
| 6,061,692 A | 5/2000 | Thomas et al. |
| 6,072,490 A | 6/2000 | Bates et al. |
| 6,076,148 A | 6/2000 | Kedem et al. |
| 6,088,697 A | 7/2000 | Crockett et al. |
| 6,094,416 A | 7/2000 | Ying |
| 6,105,129 A | 8/2000 | Meier et al. |
| 6,112,239 A | 8/2000 | Kenner et al. |
| 6,122,668 A | 9/2000 | Teng et al. |
| 6,131,095 A | 10/2000 | Low et al. |
| 6,131,148 A | 10/2000 | West et al. |
| 6,131,190 A | 10/2000 | Sidwell |
| 6,137,864 A | 10/2000 | Yaker |
| 6,148,377 A | 11/2000 | Carter et al. |
| 6,148,412 A | 11/2000 | Cannon et al. |
| 6,154,787 A | 11/2000 | Urevig et al. |
| 6,154,852 A | 11/2000 | Amundson et al. |
| 6,158,044 A | 12/2000 | Tibbetts |
| 6,161,111 A | 12/2000 | Mutalik et al. |
| 6,163,856 A | 12/2000 | Dion et al. |
| 6,167,402 A | 12/2000 | Yeager |
| 6,175,829 B1 | 1/2001 | Li et al. |
| 6,195,695 B1 | 2/2001 | Cheston et al. |
| 6,205,450 B1 | 3/2001 | Kanome et al. |
| 6,212,512 B1 | 4/2001 | Barney et al. |
| 6,212,521 B1 | 4/2001 | Minami et al. |
| 6,230,164 B1 | 5/2001 | Rekieta et al. |
| 6,260,068 B1 | 7/2001 | Zalewski et al. |
| 6,260,069 B1 | 7/2001 | Anglin |
| 6,269,431 B1 | 7/2001 | Dunham |
| 6,275,953 B1 | 8/2001 | Vahalia et al. |
| 6,279,078 B1 | 8/2001 | Sicola et al. |
| 6,292,783 B1 | 9/2001 | Rohler |
| 6,301,592 B1 | 10/2001 | Aoyama et al. |
| 6,304,880 B1 | 10/2001 | Kishi |
| 6,311,193 B1 | 10/2001 | Sekido et al. |
| 6,324,581 B1 | 11/2001 | Xu et al. |
| 6,328,766 B1 | 12/2001 | Long |
| 6,330,570 B1 | 12/2001 | Crighton |
| 6,330,642 B1 | 12/2001 | Carteau |
| 6,343,324 B1 | 1/2002 | Hubis et al. |
| 6,350,199 B1 | 2/2002 | Williams et al. |
| RE37,601 E | 3/2002 | Eastridge et al. |
| 6,353,878 B1 | 3/2002 | Dunham |
| 6,356,801 B1 | 3/2002 | Goodman et al. |
| 6,363,464 B1 | 3/2002 | Mangione |
| 6,366,986 B1 | 4/2002 | St. Pierre et al. |
| 6,366,988 B1 | 4/2002 | Skiba et al. |
| 6,374,336 B1 | 4/2002 | Peters et al. |
| 6,374,363 B1 | 4/2002 | Wu et al. |
| 6,389,432 B1 | 5/2002 | Pothapragada et al. |
| 6,397,308 B1 | 5/2002 | Ofek et al. |
| 6,418,478 B1 | 7/2002 | Ignatius et al. |
| 6,421,711 B1 | 7/2002 | Blumenau et al. |
| 6,434,681 B1 | 8/2002 | Amangau |
| 6,438,595 B1 | 8/2002 | Blumenau et al. |
| 6,466,950 B1 | 10/2002 | Ono |
| 6,473,775 B1 | 10/2002 | Kusters et al. |
| 6,487,561 B1 | 11/2002 | Ofek et al. |
| 6,487,644 B1 | 11/2002 | Huebsch et al. |

(56) References Cited

U.S. PATENT DOCUMENTS

| | | |
|---|---|---|
| 6,487,645 B1 | 11/2002 | Clark et al. |
| 6,502,205 B1 | 12/2002 | Yanai et al. |
| 6,516,314 B1 | 2/2003 | Birkler et al. |
| 6,516,327 B1 | 2/2003 | Zondervan et al. |
| 6,516,348 B1 | 2/2003 | MacFarlane et al. |
| 6,519,679 B2 | 2/2003 | Devireddy et al. |
| 6,538,669 B1 | 3/2003 | Lagueux, Jr. et al. |
| 6,539,462 B1 | 3/2003 | Mikkelsen et al. |
| 6,542,468 B1 | 4/2003 | Hatakeyama |
| 6,542,909 B1 | 4/2003 | Tamer et al. |
| 6,542,972 B2 | 4/2003 | Ignatius et al. |
| 6,564,228 B1 | 5/2003 | O'Connor |
| 6,581,143 B2 | 6/2003 | Gagne et al. |
| 6,604,118 B2 | 8/2003 | Kleinman et al. |
| 6,604,149 B1 | 8/2003 | Deo et al. |
| 6,611,849 B1 | 8/2003 | Raff et al. |
| 6,615,223 B1 | 9/2003 | Shih et al. |
| 6,629,189 B1 | 9/2003 | Sandstrom |
| 6,631,477 B1 | 10/2003 | LeCrone et al. |
| 6,631,493 B2 | 10/2003 | Ottesen et al. |
| 6,647,396 B2 | 11/2003 | Parnell et al. |
| 6,647,473 B1 | 11/2003 | Golds et al. |
| 6,651,075 B1 | 11/2003 | Kusters et al. |
| 6,654,825 B2 | 11/2003 | Clapp et al. |
| 6,658,436 B2 | 12/2003 | Oshinsky et al. |
| 6,658,526 B2 | 12/2003 | Nguyen et al. |
| 6,662,198 B2 | 12/2003 | Satyanarayanan et al. |
| 6,665,815 B1 | 12/2003 | Goldstein et al. |
| 6,681,230 B1 | 1/2004 | Blott et al. |
| 6,691,209 B1 | 2/2004 | O'Connell |
| 6,721,767 B2 | 4/2004 | De Meno et al. |
| 6,728,733 B2 | 4/2004 | Tokui |
| 6,732,124 B1 | 5/2004 | Koseki et al. |
| 6,732,125 B1 | 5/2004 | Autrey et al. |
| 6,742,092 B1 | 5/2004 | Huebsch et al. |
| 6,748,504 B2 | 6/2004 | Sawdon et al. |
| 6,751,635 B1 | 6/2004 | Chen et al. |
| 6,757,794 B2 | 6/2004 | Cabrera et al. |
| 6,760,723 B2 | 7/2004 | Oshinsky et al. |
| 6,763,351 B1 | 7/2004 | Subramaniam et al. |
| 6,789,161 B1 | 9/2004 | Blendermann et al. |
| 6,792,472 B1 | 9/2004 | Otterness et al. |
| 6,792,518 B2 | 9/2004 | Armangau et al. |
| 6,799,258 B1 | 9/2004 | Linde |
| 6,820,035 B1 | 11/2004 | Zahavi |
| 6,836,779 B2 | 12/2004 | Poulin |
| 6,839,724 B2 | 1/2005 | Manchanda et al. |
| 6,871,163 B2 | 3/2005 | Hiller et al. |
| 6,871,271 B2 | 3/2005 | Ohran et al. |
| 6,880,051 B2 | 4/2005 | Timpanaro-Perrotta |
| 6,886,020 B1 | 4/2005 | Zahavi et al. |
| 6,892,211 B2 | 5/2005 | Hitz et al. |
| 6,912,482 B2 | 6/2005 | Kaiser |
| 6,925,476 B1 | 8/2005 | Multer et al. |
| 6,925,512 B2 | 8/2005 | Louzoun et al. |
| 6,938,135 B1 | 8/2005 | Kekre et al. |
| 6,938,180 B1 | 8/2005 | Dysert et al. |
| 6,941,393 B2 | 9/2005 | Secatch |
| 6,944,796 B2 | 9/2005 | Joshi et al. |
| 6,952,705 B2 | 10/2005 | Knoblock et al. |
| 6,952,758 B2 | 10/2005 | Chron et al. |
| 6,954,834 B2 | 10/2005 | Slater et al. |
| 6,968,351 B2 | 11/2005 | Butterworth |
| 6,973,553 B1 | 12/2005 | Archibald, Jr. et al. |
| 6,978,265 B2 | 12/2005 | Schumacher |
| 6,981,177 B2 | 12/2005 | Beattie |
| 6,983,351 B2 | 1/2006 | Gibble et al. |
| 6,993,539 B2 | 1/2006 | Federwisch et al. |
| 7,003,519 B1 | 2/2006 | Biettron et al. |
| 7,003,641 B2 | 2/2006 | Prahlad et al. |
| 7,007,046 B2 | 2/2006 | Manley et al. |
| 7,032,131 B2 | 4/2006 | Lubbers et al. |
| 7,035,880 B1 | 4/2006 | Crescenti et al. |
| 7,039,661 B1 | 5/2006 | Ranade |
| 7,051,050 B2 | 5/2006 | Chen et al. |
| 7,062,761 B2 | 6/2006 | Slavin et al. |
| 7,065,538 B2 | 6/2006 | Aronoff et al. |
| 7,068,597 B1 | 6/2006 | Fijolek et al. |
| 7,082,441 B1 | 7/2006 | Zahavi et al. |
| 7,085,787 B2 | 8/2006 | Beier et al. |
| 7,085,904 B2 | 8/2006 | Mizuno et al. |
| 7,093,012 B2 | 8/2006 | Olstad et al. |
| 7,096,315 B2 | 8/2006 | Takeda et al. |
| 7,103,731 B2 | 9/2006 | Gibble et al. |
| 7,103,740 B1 | 9/2006 | Colgrove et al. |
| 7,106,691 B1 | 9/2006 | Decaluwe et al. |
| 7,107,298 B2 | 9/2006 | Prahlad et al. |
| 7,107,395 B1 | 9/2006 | Ofek et al. |
| 7,111,021 B1 | 9/2006 | Lewis et al. |
| 7,120,757 B2 | 10/2006 | Tsuge |
| 7,130,860 B2 | 10/2006 | Pachet |
| 7,130,970 B2 | 10/2006 | Devassy et al. |
| 7,139,932 B2 | 11/2006 | Watanabe |
| 7,155,465 B2 | 12/2006 | Lee et al. |
| 7,155,633 B2 | 12/2006 | Tuma et al. |
| 7,158,985 B1 | 1/2007 | Liskov |
| 7,177,866 B2 * | 2/2007 | Holenstein et al. ........... 707/615 |
| 7,181,477 B2 | 2/2007 | Saika et al. |
| 7,188,292 B2 | 3/2007 | Cordina et al. |
| 7,191,198 B2 | 3/2007 | Asano et al. |
| 7,194,454 B2 | 3/2007 | Hansen et al. |
| 7,203,807 B2 | 4/2007 | Urabe et al. |
| 7,209,972 B1 | 4/2007 | Ignatius et al. |
| 7,225,204 B2 | 5/2007 | Manley et al. |
| 7,225,208 B2 | 5/2007 | Midgley et al. |
| 7,225,210 B2 | 5/2007 | Guthrie, II. |
| 7,228,456 B2 | 6/2007 | Lecrone et al. |
| 7,231,391 B2 | 6/2007 | Aronoff et al. |
| 7,231,544 B2 | 6/2007 | Tan et al. |
| 7,234,115 B1 | 6/2007 | Sprauve et al. |
| 7,246,140 B2 | 7/2007 | Therrien et al. |
| 7,246,207 B2 | 7/2007 | Kottomtharayil et al. |
| 7,257,689 B1 | 8/2007 | Baird |
| 7,269,612 B2 | 9/2007 | Devarakonda et al. |
| 7,269,641 B2 | 9/2007 | Powers et al. |
| 7,272,606 B2 | 9/2007 | Borthakur et al. |
| 7,275,138 B2 | 9/2007 | Saika |
| 7,275,177 B2 | 9/2007 | Armangau et al. |
| 7,278,142 B2 | 10/2007 | Bandhole et al. |
| 7,284,153 B2 | 10/2007 | Okbay et al. |
| 7,287,047 B2 | 10/2007 | Kavuri |
| 7,293,133 B1 | 11/2007 | Colgrove et al. |
| 7,296,125 B2 | 11/2007 | Ohran |
| 7,315,923 B2 | 1/2008 | Retnamma et al. |
| 7,318,134 B1 | 1/2008 | Oliveira et al. |
| 7,340,652 B2 | 3/2008 | Jarvis et al. |
| 7,343,356 B2 | 3/2008 | Prahlad et al. |
| 7,343,365 B2 | 3/2008 | Farnham et al. |
| 7,343,453 B2 | 3/2008 | Prahlad et al. |
| 7,343,459 B2 | 3/2008 | Prahlad et al. |
| 7,346,623 B2 | 3/2008 | Prahlad et al. |
| 7,346,751 B2 | 3/2008 | Prahlad et al. |
| 7,356,657 B2 | 4/2008 | Mikami |
| 7,359,917 B2 | 4/2008 | Winter et al. |
| 7,370,232 B2 | 5/2008 | Safford |
| 7,373,364 B1 | 5/2008 | Chapman |
| 7,380,072 B2 | 5/2008 | Kottomtharayil et al. |
| 7,389,311 B1 | 6/2008 | Crescenti et al. |
| 7,392,360 B1 | 6/2008 | Aharoni et al. |
| 7,395,282 B1 | 7/2008 | Crescenti et al. |
| 7,401,064 B1 | 7/2008 | Arone et al. |
| 7,409,509 B2 | 8/2008 | Devassy et al. |
| 7,415,488 B1 | 8/2008 | Muth et al. |
| 7,430,587 B2 | 9/2008 | Malone et al. |
| 7,433,301 B2 | 10/2008 | Akahane et al. |
| 7,440,982 B2 | 10/2008 | Lu et al. |
| 7,454,569 B2 | 11/2008 | Kavuri et al. |
| 7,461,230 B1 | 12/2008 | Gupta et al. |
| 7,464,236 B2 | 12/2008 | Sano et al. |
| 7,467,167 B2 | 12/2008 | Patterson |
| 7,467,267 B1 | 12/2008 | Mayock |
| 7,469,262 B2 | 12/2008 | Baskaran et al. |
| 7,472,238 B1 | 12/2008 | Gokhale |
| 7,472,312 B2 | 12/2008 | Jarvis et al. |

(56) References Cited

U.S. PATENT DOCUMENTS

| | | |
|---|---|---|
| 7,475,284 B2 | 1/2009 | Koike |
| 7,484,054 B2 | 1/2009 | Kottomtharayil et al. |
| 7,490,207 B2 | 2/2009 | Amarendran |
| 7,496,589 B1 | 2/2009 | Jain et al. |
| 7,496,690 B2 | 2/2009 | Beverly et al. |
| 7,500,053 B1 | 3/2009 | Kavuri et al. |
| 7,500,150 B2 | 3/2009 | Sharma et al. |
| 7,502,902 B2 | 3/2009 | Sato |
| 7,509,316 B2 | 3/2009 | Greenblatt et al. |
| 7,512,601 B2 | 3/2009 | Cucerzan et al. |
| 7,516,088 B2 | 4/2009 | Johnson et al. |
| 7,519,726 B2 | 4/2009 | Palliyll et al. |
| 7,523,483 B2 | 4/2009 | Dogan |
| 7,529,745 B2 | 5/2009 | Ahluwalia et al. |
| 7,529,748 B2 | 5/2009 | Wen et al. |
| 7,529,782 B2 | 5/2009 | Prahlad et al. |
| 7,529,898 B2 | 5/2009 | Nguyen et al. |
| 7,532,340 B2 | 5/2009 | Koppich et al. |
| 7,533,181 B2 | 5/2009 | Dawson et al. |
| 7,536,291 B1 | 5/2009 | Retnamma et al. |
| 7,539,707 B2 | 5/2009 | Prahlad et al. |
| 7,539,835 B2 | 5/2009 | Kaiser |
| 7,543,125 B2 | 6/2009 | Gokhale |
| 7,546,324 B2 | 6/2009 | Prahlad et al. |
| 7,546,364 B2 | 6/2009 | Raman et al. |
| 7,565,572 B2 | 7/2009 | Yamasaki |
| 7,581,077 B2 | 8/2009 | Ignatius et al. |
| 7,593,966 B2 | 9/2009 | Therrien et al. |
| 7,596,586 B2 | 9/2009 | Gokhale et al. |
| 7,606,841 B1 | 10/2009 | Ranade |
| 7,606,844 B2 | 10/2009 | Kottomtharayil |
| 7,613,748 B2 | 11/2009 | Brockway et al. |
| 7,613,750 B2 | 11/2009 | Valiyaparambil et al. |
| 7,617,253 B2 | 11/2009 | Prahlad et al. |
| 7,617,262 B2 | 11/2009 | Prahlad et al. |
| 7,617,321 B2 | 11/2009 | Clark |
| 7,617,369 B1 | 11/2009 | Bezbaruah et al. |
| 7,617,541 B2 | 11/2009 | Plotkin et al. |
| 7,627,598 B1 | 12/2009 | Burke |
| 7,627,617 B2 | 12/2009 | Kavuri et al. |
| 7,636,743 B2 | 12/2009 | Erofeev |
| 7,651,593 B2 | 1/2010 | Prahlad et al. |
| 7,661,028 B2 | 2/2010 | Erofeev |
| 7,668,798 B2 | 2/2010 | Scanlon et al. |
| 7,669,029 B1 | 2/2010 | Mishra et al. |
| 7,685,126 B2 | 3/2010 | Patel et al. |
| 7,689,467 B1 | 3/2010 | Belanger et al. |
| 7,702,533 B2 | 4/2010 | Barnard et al. |
| 7,702,670 B1 | 4/2010 | Duprey et al. |
| 7,707,184 B1 | 4/2010 | Zhang et al. |
| 7,716,171 B2 | 5/2010 | Kryger |
| 7,734,715 B2 | 6/2010 | Hyakutake et al. |
| 7,739,235 B2 | 6/2010 | Rousseau et al. |
| 7,810,067 B2 | 10/2010 | Kaelicke et al. |
| 7,831,553 B2 | 11/2010 | Prahlad et al. |
| 7,831,622 B2 | 11/2010 | Prahlad et al. |
| 7,840,533 B2 | 11/2010 | Prahlad et al. |
| 7,840,537 B2 | 11/2010 | Gokhale et al. |
| 7,870,355 B2 | 1/2011 | Erofeev |
| 7,904,681 B1 | 3/2011 | Bappe |
| 7,930,476 B1 | 4/2011 | Castelli et al. |
| 7,962,455 B2 | 6/2011 | Erofeev |
| 7,962,709 B2 | 6/2011 | Agrawal |
| 8,005,795 B2 | 8/2011 | Galipeau et al. |
| 8,024,294 B2 | 9/2011 | Kottomtharayil |
| 8,121,983 B2 | 2/2012 | Prahlad et al. |
| 8,166,263 B2 | 4/2012 | Prahlad |
| 8,190,565 B2 | 5/2012 | Prahlad et al. |
| 8,195,623 B2 | 6/2012 | Prahlad et al. |
| 8,271,830 B2 | 9/2012 | Erofeev |
| 8,285,684 B2 | 10/2012 | Prahlad et al. |
| 8,352,422 B2 | 1/2013 | Prahlad et al. |
| 8,463,751 B2 | 6/2013 | Kottomtharayil |
| 8,489,656 B2 | 7/2013 | Erofeev |
| 8,504,515 B2 | 8/2013 | Prahlad et al. |
| 8,504,517 B2 | 8/2013 | Agrawal |
| 2001/0029512 A1 | 10/2001 | Oshinsky et al. |
| 2001/0029517 A1 | 10/2001 | De Meno et al. |
| 2001/0032172 A1 | 10/2001 | Moulinet et al. |
| 2001/0035866 A1 | 11/2001 | Finger et al. |
| 2001/0042222 A1 | 11/2001 | Kedem et al. |
| 2001/0044807 A1 | 11/2001 | Kleiman et al. |
| 2002/0002557 A1 | 1/2002 | Straube et al. |
| 2002/0004883 A1 | 1/2002 | Nguyen et al. |
| 2002/0019909 A1 | 2/2002 | D'Errico |
| 2002/0023051 A1 | 2/2002 | Kunzle et al. |
| 2002/0040376 A1 | 4/2002 | Yamanaka et al. |
| 2002/0042869 A1 | 4/2002 | Tate et al. |
| 2002/0049626 A1 | 4/2002 | Mathias et al. |
| 2002/0049718 A1 | 4/2002 | Kleiman et al. |
| 2002/0049738 A1 | 4/2002 | Epstein |
| 2002/0049778 A1 | 4/2002 | Bell et al. |
| 2002/0062230 A1 | 5/2002 | Morag et al. |
| 2002/0069324 A1 | 6/2002 | Gerasimov et al. |
| 2002/0083055 A1 | 6/2002 | Pachet et al. |
| 2002/0091712 A1 * | 7/2002 | Martin et al. ............. 707/200 |
| 2002/0103848 A1 | 8/2002 | Giacomini et al. |
| 2002/0107877 A1 | 8/2002 | Whiting et al. |
| 2002/0112134 A1 | 8/2002 | Ohran et al. |
| 2002/0120741 A1 | 8/2002 | Webb et al. |
| 2002/0124137 A1 | 9/2002 | Ulrich et al. |
| 2002/0133511 A1 | 9/2002 | Hostetter et al. |
| 2002/0133512 A1 | 9/2002 | Milillo et al. |
| 2002/0161753 A1 | 10/2002 | Inaba et al. |
| 2002/0174107 A1 | 11/2002 | Poulin |
| 2002/0174416 A1 | 11/2002 | Bates et al. |
| 2002/0181395 A1 | 12/2002 | Foster et al. |
| 2003/0005119 A1 | 1/2003 | Mercier et al. |
| 2003/0018657 A1 | 1/2003 | Monday |
| 2003/0023893 A1 | 1/2003 | Lee et al. |
| 2003/0028736 A1 | 2/2003 | Berkowitz et al. |
| 2003/0033308 A1 | 2/2003 | Patel et al. |
| 2003/0061491 A1 | 3/2003 | Jaskiewicz et al. |
| 2003/0079018 A1 | 4/2003 | Lolayekar et al. |
| 2003/0097296 A1 | 5/2003 | Putt |
| 2003/0126200 A1 | 7/2003 | Wolff |
| 2003/0131278 A1 | 7/2003 | Fujibayashi |
| 2003/0135783 A1 | 7/2003 | Martin et al. |
| 2003/0161338 A1 | 8/2003 | Ng et al. |
| 2003/0167380 A1 | 9/2003 | Green et al. |
| 2003/0177149 A1 | 9/2003 | Coombs |
| 2003/0177321 A1 | 9/2003 | Watanabe |
| 2003/0187847 A1 | 10/2003 | Lubbers et al. |
| 2003/0225800 A1 | 12/2003 | Kavuri |
| 2004/0006572 A1 | 1/2004 | Hoshino et al. |
| 2004/0006578 A1 | 1/2004 | Yu |
| 2004/0010487 A1 | 1/2004 | Prahlad et al. |
| 2004/0015468 A1 | 1/2004 | Beier et al. |
| 2004/0039679 A1 | 2/2004 | Norton et al. |
| 2004/0078632 A1 | 4/2004 | Infante et al. |
| 2004/0098425 A1 | 5/2004 | Wiss et al. |
| 2004/0107199 A1 | 6/2004 | Dairymple et al. |
| 2004/0117438 A1 | 6/2004 | Considine et al. |
| 2004/0117572 A1 | 6/2004 | Welsh et al. |
| 2004/0133634 A1 | 7/2004 | Luke et al. |
| 2004/0139128 A1 | 7/2004 | Becker et al. |
| 2004/0193625 A1 | 9/2004 | Sutoh |
| 2004/0193953 A1 | 9/2004 | Callahan et al. |
| 2004/0205206 A1 | 10/2004 | Naik et al. |
| 2004/0225437 A1 | 11/2004 | Endo et al. |
| 2004/0230829 A1 | 11/2004 | Dogan et al. |
| 2004/0236958 A1 | 11/2004 | Teicher et al. |
| 2004/0249883 A1 | 12/2004 | Srinivasan et al. |
| 2004/0250033 A1 | 12/2004 | Prahlad et al. |
| 2004/0254919 A1 | 12/2004 | Giuseppini |
| 2004/0260678 A1 | 12/2004 | Verbowski et al. |
| 2004/0267777 A1 | 12/2004 | Sugimura et al. |
| 2004/0267835 A1 | 12/2004 | Zwilling et al. |
| 2004/0267836 A1 | 12/2004 | Armangau et al. |
| 2005/0027892 A1 | 2/2005 | McCabe et al. |
| 2005/0033800 A1 | 2/2005 | Kavuri et al. |
| 2005/0044114 A1 | 2/2005 | Kottomtharayil et al. |
| 2005/0060613 A1 | 3/2005 | Cheng |
| 2005/0080928 A1 | 4/2005 | Beverly et al. |

(56) References Cited

U.S. PATENT DOCUMENTS

| | | |
|---|---|---|
| 2005/0086443 A1 | 4/2005 | Mizuno et al. |
| 2005/0108292 A1 | 5/2005 | Burton et al. |
| 2005/0114406 A1 | 5/2005 | Borthakur et al. |
| 2005/0131900 A1 | 6/2005 | Palliyll et al. |
| 2005/0138306 A1 | 6/2005 | Panchbudhe et al. |
| 2005/0144202 A1 | 6/2005 | Chen |
| 2005/0172073 A1 | 8/2005 | Voigt |
| 2005/0187982 A1 | 8/2005 | Sato |
| 2005/0187992 A1 | 8/2005 | Prahlad et al. |
| 2005/0188109 A1 | 8/2005 | Shiga et al. |
| 2005/0188254 A1 | 8/2005 | Urabe et al. |
| 2005/0193026 A1 | 9/2005 | Prahlad et al. |
| 2005/0198083 A1 | 9/2005 | Saika et al. |
| 2005/0228875 A1 | 10/2005 | Monitzer et al. |
| 2005/0246376 A1 | 11/2005 | Lu et al. |
| 2005/0246510 A1 | 11/2005 | Retnamma et al. |
| 2005/0254456 A1 | 11/2005 | Sakai |
| 2005/0268068 A1 | 12/2005 | Ignatius et al. |
| 2006/0005048 A1 | 1/2006 | Osaki et al. |
| 2006/0010154 A1 | 1/2006 | Prahlad et al. |
| 2006/0010227 A1 | 1/2006 | Atluri |
| 2006/0010341 A1 | 1/2006 | Kodama |
| 2006/0020616 A1 | 1/2006 | Hardy et al. |
| 2006/0034454 A1 | 2/2006 | Damgaard et al. |
| 2006/0047805 A1 | 3/2006 | Byrd et al. |
| 2006/0047931 A1 | 3/2006 | Saika |
| 2006/0092861 A1 | 5/2006 | Corday et al. |
| 2006/0107089 A1 | 5/2006 | Jansz et al. |
| 2006/0120401 A1 | 6/2006 | Harada et al. |
| 2006/0129537 A1 | 6/2006 | Torii et al. |
| 2006/0136685 A1 | 6/2006 | Griv et al. |
| 2006/0155946 A1 | 7/2006 | Ji |
| 2006/0171315 A1 | 8/2006 | Choi et al. |
| 2006/0174075 A1 | 8/2006 | Sutoh |
| 2006/0215564 A1 | 9/2006 | Breitgand et al. |
| 2006/0230244 A1 | 10/2006 | Amarendran et al. |
| 2006/0242371 A1 | 10/2006 | Shono et al. |
| 2006/0242489 A1 | 10/2006 | Brockway et al. |
| 2007/0033437 A1 | 2/2007 | Kawamura |
| 2007/0043956 A1 | 2/2007 | El Far et al. |
| 2007/0050547 A1 | 3/2007 | Sano |
| 2007/0055737 A1 | 3/2007 | Yamashita et al. |
| 2007/0094467 A1 | 4/2007 | Yamasaki |
| 2007/0100867 A1 | 5/2007 | Celik et al. |
| 2007/0112897 A1 | 5/2007 | Asano et al. |
| 2007/0113006 A1 | 5/2007 | Elliott et al. |
| 2007/0124347 A1 | 5/2007 | Vivian et al. |
| 2007/0124348 A1 | 5/2007 | Claborn et al. |
| 2007/0130373 A1 | 6/2007 | Kalwitz |
| 2007/0143371 A1 | 6/2007 | Kottomtharayil |
| 2007/0143756 A1 | 6/2007 | Gokhale |
| 2007/0179990 A1 | 8/2007 | Zimran et al. |
| 2007/0183224 A1 | 8/2007 | Erofeev |
| 2007/0185852 A1 | 8/2007 | Erofeev |
| 2007/0185937 A1 | 8/2007 | Prahlad et al. |
| 2007/0185938 A1 | 8/2007 | Prahlad et al. |
| 2007/0185939 A1 | 8/2007 | Prahland et al. |
| 2007/0185940 A1 | 8/2007 | Prahlad et al. |
| 2007/0186042 A1 | 8/2007 | Kottomtharayil et al. |
| 2007/0186068 A1 | 8/2007 | Agrawal |
| 2007/0198602 A1 | 8/2007 | Ngo et al. |
| 2007/0226438 A1 | 9/2007 | Erofeev |
| 2007/0244571 A1 | 10/2007 | Wilson et al. |
| 2007/0260609 A1 | 11/2007 | Tulyani |
| 2007/0276848 A1 | 11/2007 | Kim |
| 2007/0288536 A1 | 12/2007 | Sen et al. |
| 2008/0016126 A1 | 1/2008 | Kottomtharayil et al. |
| 2008/0016293 A1 | 1/2008 | Saika |
| 2008/0028009 A1 | 1/2008 | Ngo |
| 2008/0059515 A1 | 3/2008 | Fulton |
| 2008/0077634 A1 | 3/2008 | Quakenbush |
| 2008/0103916 A1 | 5/2008 | Camarador et al. |
| 2008/0104357 A1 | 5/2008 | Kim et al. |
| 2008/0114815 A1 | 5/2008 | Sutoh |
| 2008/0147878 A1 | 6/2008 | Kottomtharayil et al. |
| 2008/0183775 A1 | 7/2008 | Prahlad et al. |
| 2008/0205301 A1 | 8/2008 | Burton et al. |
| 2008/0208933 A1 | 8/2008 | Lyon |
| 2008/0228987 A1 | 9/2008 | Yagi |
| 2008/0229037 A1 | 9/2008 | Bunte et al. |
| 2008/0243879 A1 | 10/2008 | Gokhale et al. |
| 2008/0243914 A1 | 10/2008 | Prahlad et al. |
| 2008/0243957 A1 | 10/2008 | Prahlad et al. |
| 2008/0243958 A1 | 10/2008 | Prahlad et al. |
| 2008/0244177 A1 | 10/2008 | Crescenti et al. |
| 2008/0244205 A1 | 10/2008 | Amano et al. |
| 2008/0250178 A1 | 10/2008 | Haustein et al. |
| 2008/0306954 A1 | 12/2008 | Hornqvist |
| 2008/0313497 A1 | 12/2008 | Hirakawa |
| 2009/0013014 A1 | 1/2009 | Kern |
| 2009/0044046 A1 | 2/2009 | Yamasaki |
| 2009/0113056 A1 | 4/2009 | Tameshige et al. |
| 2009/0150462 A1 | 6/2009 | McClanahan et al. |
| 2009/0182963 A1 | 7/2009 | Prahlad et al. |
| 2009/0187944 A1 | 7/2009 | White et al. |
| 2009/0319534 A1 | 12/2009 | Gokhale |
| 2009/0319585 A1 | 12/2009 | Gokhale |
| 2010/0005259 A1 | 1/2010 | Prahlad |
| 2010/0049753 A1 | 2/2010 | Prahlad et al. |
| 2010/0094808 A1 | 4/2010 | Erofeev |
| 2010/0100529 A1 | 4/2010 | Erofeev |
| 2010/0122053 A1 | 5/2010 | Prahlad et al. |
| 2010/0131461 A1 | 5/2010 | Prahlad et al. |
| 2010/0131467 A1 | 5/2010 | Prahlad et al. |
| 2010/0145909 A1 | 6/2010 | Ngo |
| 2010/0153338 A1 | 6/2010 | Ngo et al. |
| 2010/0179941 A1 | 7/2010 | Agrawal et al. |
| 2010/0205150 A1 | 8/2010 | Prahlad et al. |
| 2010/0211571 A1 | 8/2010 | Prahlad et al. |
| 2011/0066599 A1 | 3/2011 | Prahlad et al. |
| 2011/0238621 A1 | 9/2011 | Agrawal |
| 2011/0246416 A1 | 10/2011 | Prahlad et al. |
| 2011/0246429 A1 | 10/2011 | Prahlad et al. |
| 2011/0295804 A1 | 12/2011 | Erofeev |
| 2011/0295805 A1 | 12/2011 | Erofeev |
| 2011/0295806 A1 | 12/2011 | Erofeev |
| 2012/0030171 A1 | 2/2012 | Kottomtharayil |
| 2013/0006926 A1 | 1/2013 | Erofeev |
| 2013/0006938 A1 | 1/2013 | Prahlad et al. |
| 2013/0006942 A1 | 1/2013 | Prahlad et al. |

FOREIGN PATENT DOCUMENTS

| | | |
|---|---|---|
| EP | 0259912 | 3/1988 |
| EP | 0405926 | 1/1991 |
| EP | 0467546 | 1/1992 |
| EP | 0774715 | 5/1997 |
| EP | 0809184 | 11/1997 |
| EP | 0862304 | 9/1998 |
| EP | 0899662 | 3/1999 |
| EP | 0981090 | 2/2000 |
| EP | 1174795 | 1/2002 |
| EP | 1349089 | 1/2003 |
| EP | 1349088 | 10/2003 |
| EP | 1579331 | 9/2005 |
| EP | 1974296 | 10/2008 |
| GB | 2256952 | 12/1992 |
| GB | 2411030 | 8/2005 |
| JP | 05189281 | 7/1993 |
| JP | 06274605 | 9/1994 |
| JP | 09016463 | 1/1997 |
| JP | 11259348 | 9/1999 |
| JP | 200347811 | 12/2000 |
| WO | WO 93/03549 | 2/1993 |
| WO | WO 95/13580 | 5/1995 |
| WO | WO 98/39707 | 9/1998 |
| WO | WO 99/12098 | 3/1999 |
| WO | WO 99/14692 | 3/1999 |
| WO | WO 02/095632 | 11/2002 |
| WO | WO 03/028183 | 4/2003 |
| WO | WO 2004/034197 | 4/2004 |
| WO | WO 2005/055093 | 6/2005 |
| WO | WO 2005/086032 | 9/2005 |

(56) References Cited

FOREIGN PATENT DOCUMENTS

| WO | WO 2007/053314 | 5/2007 |
|---|---|---|
| WO | WO 2007/075587 | 7/2007 |
| WO | WO 2010/068570 | 6/2010 |

OTHER PUBLICATIONS

U.S. Appl. No. 12/433,238, filed Apr. 30, 2009, Prahlad et al.
Armstead et al., "Implementation of a Campus-Wide Distributed Mass Storage Service: The Dream vs. Reality," IEEE, 1995, pp. 190-199.
Arneson, "Development of Omniserver; Mass Storage Systems," Control Data Corporation, 1990, pp. 88-93.
Arneson, "Mass Storage Archiving in Network Environments" IEEE, 1998, pp. 45-50.
Ashton, et al., "Two Decades of policy-based storage management for the IBM mainframe computer", www.research.ibm.com, 19 pages, published Apr. 10, 2003, printed Jan. 3, 2009., www.research.ibm.com, Apr. 10, 2003, pp. 19.
Canadian Office Action dated Dec. 29, 2010, Application No. CA2546304.
Eitel, "Backup and Storage Management in Distributed Heterogeneous Environments," IEEE, 1994, pp. 124-126.
European Examination Report; Application No. 06848901.2, Apr. 1, 2009, pp. 7.
Examiner's First Report; Application No. 2006331932 May 11, 2011 in 2 pages.
Examiner's Report for Australian Application No. 2003279847, Dated Dec. 9, 2008, 4 pages.
Final Office Action for Japanese Application No. 2003531581, Mail Date Mar. 24, 2009, 6 pages.
First Office Action for Japanese Application No. 2003531581, Mail Date Jul. 8, 2008, 8 pages.
First Office Action in Canadian application No. 2,632,935 dated Feb. 6, 2012, in 5 pages.
Gait, "The Optical File Cabinet: A Random-Access File system for Write-Once Optical Disks," IEEE Computer, vol. 21, No. 6, pp. 11-22 (1988).
Gray, et al. "Transaction processing: concepts and techniques" 1994, Morgan Kaufmann Publishers, USA, pp. 604-609, 646-655.
Harrington, "The RFP Process: How to Hire a Third Party", Transportation & Distribution, Sep. 1988, vol. 39, Issue 9, in 5 pages.
http://en.wikipedia.org/wiki/Naive_Bayes_classifier, printed on Jun. 1, 2010, in 7 pages.
International Preliminary Report on Patentability, PCT Application No. PCT/US2009/066880, mailed Jun. 23, 2011, in 9 pages.
International Search Report and Written Opinion dated Jan. 11, 2006, PCT/US2004/038455.
International Search Report and Written Opinion dated Mar. 25, 2010, PCT/US2009/066880.
International Search Report and Written Opinion dated Nov. 13, 2009, PCT/US2007/081681.
International Search Report and Written Opinion issued in PCT Application No. PCT/US2011/38436, mailed Sep. 21, 2011, in 18 pages.
International Search Report dated Dec. 28, 2009, PCT/US2004/038324.
International Search Report dated May 15, 2007, PCT/US2006/048273.
Jander, "Launching Storage-Area Net," Data Communications, US, McGraw Hill, NY, vol. 27, No. 4(Mar. 21, 1998), pp. 64-72.
Kashyap, et al., "Professional Services Automation: A knowledge Mangement approach using LSI and Domain specific Ontologies", FLAIRS-01 Proceedings, 2001, pp. 300-302.
Luis-Felipe Cabrera et al.; ADSM: A Multi-Platform, Scalable, Backup and Archive Mass Storage System; Mar. 5, 1995; pp. 420-427, IBM Research Division.
Lyon J., Design considerations in replicated database systems for disaster protection, COMPCON 1988, Feb. 29, 1988, pp. 428-430.
Microsoft Corporation, "Microsoft Exchange Server: Best Practices for Exchange Database Management," 1998.
Rosenblum et al., "The Design and Implementation of a Log-Structure File System," Operating Systems Review SIGOPS, vol. 25, No. 5, New York, US, pp. 1-15 (May 1991).
Second Examination Report in EU Appl. No. 06 848 901.2-2201 dated Dec. 3, 2010.
The Oracle8 Replication Manual, Part No. A58245-01; Chapters 1-2; Dec. 1, 1997; obtained from website: http://download-west.oracle.com/docs/cd/A64702_01/doc/server.805/a58245/toc.htm on May 20, 2009.
Veritas Software Corporation, "Veritas Volume Manager 3.2, Administrator's Guide," Aug. 2001, 360 pages.
Wiesmann M, Database replication techniques: a three parameter classification, Oct. 16, 2000, pp. 206-215.
Arneson, David A., Control Data Corporation, Development of Omniserver; Mass Storage Systems, 1990, pp. 88-93.
Canadian Office Action dated Sep. 24, 2012, Application No. 2,632,935, 2 pages.
International Search Report and Written Opinion issued in PCT Application No. PCT/US2011/030396, mailed Jul. 18, 2011, in 20 pages.
International Preliminary Report on Patentability and Written Opinion in PCT/US2011/030396 mailed Oct. 2, 2012.
International Preliminary Report on Patentability and Written Opinion in PCT/US2011/038436 mailed Dec. 4, 2012.
IBM, "Intelligent Selection of Logs Required During Recovery Processing", ip.com, Sep. 16, 2002, 4 pages.
IBM, "Near Zero Impact Backup and Data Replication Appliance", ip.com, Oct. 18, 2004, 5 pages.
Park, et al., "An Efficient Logging Scheme for Recoverable Distributed Shared Memory Systems", IEEE, 1997, 9 pages.
Exam Report in Australian Application No. 2009324800 dated Jun. 17, 2013.

\* cited by examiner

SYSTEMS AND METHODS FOR MANAGING SNAPSHOTS OF REPLICATED DATABASES

RELATED APPLICATION

This application is a continuation of U.S. patent application Ser. No. 12/424,115, entitled "SYSTEMS AND METHODS FOR MANAGING REPLICATED DATABASE DATA", filed Apr. 15, 2009, issued as U.S. Pat. No. 8,204,859, and which claims priority benefit from U.S. Provisional Patent Application No. 61/121,418, entitled "SYSTEMS AND METHODS FOR MANAGING REPLICATED DATABASE DATA," filed Dec. 10, 2008, each of which is hereby incorporated herein by reference in its entirety.

BACKGROUND OF THE INVENTION

1. Field of the Invention

The present disclosure relates to systems and methods for replicating data of one or more database applications.

2. Description of the Related Art

Electronic information has become an integral part of business operations such that many banks, insurance companies, brokerage firms, financial service providers, and a variety of other businesses rely on computer networks to store, manipulate, and display information that is constantly subject to change. Oftentimes, the success or failure of an important transaction may turn on the availability of electronic information that is both accurate and current. Accordingly, businesses seek reliable, cost-effective ways to protect and later access the information stored on their computer networks.

Many approaches to protecting data involve creating a copy of the data, such as backing up and/or replicating a database to one or more storage devices. Data shadowing and mirroring, or duplexing, provide for copying but can require lengthy amounts of time, consume valuable processing power and/or occupy large amounts of storage space for large databases. Moreover, such storage management systems can have a significant impact on the source or primary system.

To address these drawbacks, certain storage systems utilize snapshot techniques to preserve a read-only copy of database data. In general, a snapshot records the state of a storage device, database file system, or volume at a certain point in time. That is, the snapshot may be used to provide a point-in-time image of a live storage volume. Additional operations can then be performed using the snapshot copy without affecting the performance of the live volume.

In certain circumstances, however, a snapshot of a database does not necessarily provide easily accessible data. For instance, snapshots of data from a MICROSOFT EXCHANGE database generated while EXCHANGE is online results in a copy of the data that is in a "dirty shutdown" state, which prevents the data from being read or otherwise accessed by standard application programming interfaces (APIs). Although, one option is to shut down EXCHANGE each time a snapshot is to be performed on the database, such an option is not practical as the shutdowns can be time-consuming and costly.

SUMMARY OF THE INVENTION

In view of the foregoing, a need exists for improved systems and methods for database replication. For instance, there is a need for systems and methods for generating copies of database data in a clean shutdown state without taking the native database application offline. Moreover, a need exists for systems and methods that provide snapshots of database data in a useful condition without requiring the native application, or its accompanying APIs, for access to the database data.

In certain embodiments of the invention, systems and methods are disclosed for performing substantially continuous replication of a database, such as a MICROSOFT EXCHANGE database, and for providing usable read-only copies of the replicated database. For instance, snapshot systems and methods are disclosed that provide a snapshot of a replicated MICROSOFT EXCHANGE database that reflects data in a recoverable and clean shutdown state and that can be accessed or otherwise read using standard APIs without the need for the MICROSOFT EXCHANGE application program.

Such systems and methods allow known good replication copies to be viewed as copies of production volume data. For example, this technology, in certain embodiments, further allows a management component in the computing system to directly access, copy, restore, backup or otherwise manipulate the replication copies of production data as if the data was the production data of the source system, thereby improving various system performance characteristics such as access time, reducing memory requirements and reducing impact on source, or client, applications.

In certain embodiments, a method is disclosed for managing replicated data in a database system. The method comprises monitoring data transactions associated with a database application, the data transactions operative to write data to at least one source storage device. The method further includes copying the data to a target storage device based at least in part on the data transactions, wherein the target storage device comprises a target database and target transaction log files, and wherein said monitoring and copying is performed without shutting down the database application. The method also includes: (i) generating a first snapshot of at least a portion of the data stored in the target database and transaction log files; (ii) replaying, into the target database, data stored in the target transaction log files as one or more transaction logs; (iii) generating a second snapshot of at least a portion of the target database that is indicative of stored data from the database application in a recoverable state; and then (iv) reverting the target database back to a state in which the target database existed at the time of the first snapshot.

In certain embodiments, a system is disclosed for performing data management operations in a computer network environment. The system includes a database application configured to execute on a source computer and a first storage device coupled to the source computer to receive data transactions from the database application. The system also includes a module, such as a filter driver, configured to monitor the data transactions and to generate log entries based on the data transactions, at least one of the log entries having a marker indicative of a time of a known good state of the database application. The system further includes a second storage device comprising a target database and target transaction log files and a target computer coupled to the second storage device. The target computer is configured to: (i) process, based on the log entries, the data transactions to replicate data to the second storage device; (ii) perform a first snapshot operation on data stored in both the target database and the target transaction log files; (iii) replay into the target database data stored in the target transaction log files; (iv) perform a second snapshot operation on at least a portion of the target database; and (v) revert the target database back to a state in which the target database existed at the time of the first snapshot.

In certain embodiments, a method is disclosed for copying data generated on a source database system in a computer network. The method comprises processing replication data indicative of data transactions generated by a database application executing on a source system, the database transactions being directed to operations on a source database of a source storage device; replaying the replication data on a target storage device to copy the data transactions to the target storage device, the target storage device comprising a target database and target transaction log files; creating a first read-only copy of at least a portion of data stored in the target database and the target transaction log files; committing to the target database transaction logs stored in the target transaction log files, said committing following said creating the first read-only copy; creating, following said committing, a second read-only copy of at least a portion of the target database, the second read-only copy being indicative of database data from the database application in a recoverable state; and reverting the target database to a state in which the target database existed at the time of said creating the first read-only copy.

In certain embodiments, a system is disclosed for performing data management operations in a computer network environment. The system includes means for processing replication data indicative of database operations generated by a database application executing on a source computer, the database operations being directed to data on a source storage device; means for replaying the replication data on a target storage device to copy data to the target storage device, the target storage device comprising a target database and transaction log files; means for performing a first snapshot operation on data stored in both the target database and the target transaction log files; means for replaying into the target database data stored in the transaction log files; said means for performing being further configured to perform a second snapshot operation on at least a portion of the target database following replaying of the data stored in the transaction log files, the second snapshot being indicative of database data from the database application in a clean shutdown state; and means for reverting the target database back to a state in which the target database existed at the time of performing the first snapshot, wherein at least one of said means is executed on one or more computing devices.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

DETAILED DESCRIPTION OF THE PREFERRED EMBODIMENTS

Figure 1:
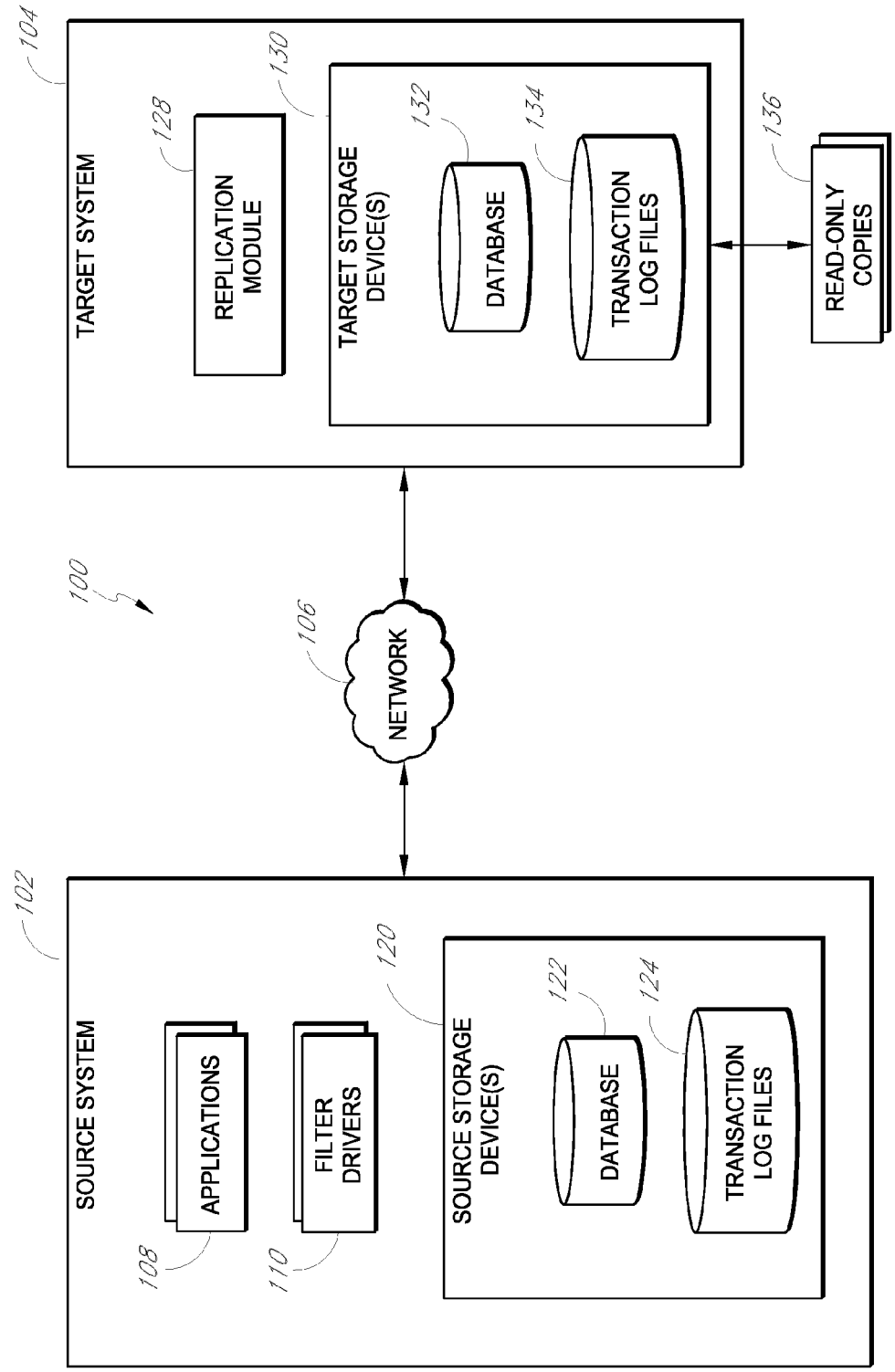
FIG. 1 illustrates a block diagram of a database replication system according to certain embodiments of the invention.

Systems and methods disclosed herein provide for the offline access of a replicated database without needing to run the native database application. Moreover, disclosed systems and methods provide for the replication of database data without shutting down the native database application to put the replicated data in a "clean shutdown" state.

In certain embodiments of the invention, systems and methods are disclosed for performing substantially continuous replication of a database, such as a MICROSOFT EXCHANGE database. For instance, certain embodiments provide for the generation of one or more snapshots of a replicated MICROSOFT EXCHANGE database, wherein the snapshot data allows for offline access to the replicated database. For instance, in certain embodiments, the replicated database can be read using JET or like APIs in place of slower APIs (e.g., MAPI) associated with MICROSOFT EXCHANGE. As a result, the direct reading of the database allows for much faster access to the replicated data.

In general, replication of database data can pose particular drawbacks. For example, standard replication of data from certain database applications can result in data that is in a recoverable state, wherein committed transactions in the database can be recovered in case of a crash. In such a state, particular computing operations of the application are complete to a point such that further operation, recovery and/or rolling back of the application can occur, based on the committed transaction data This point of referential integrity is generally referred to herein as a known good state of the application data.

However, without shutting down the database application, the data resulting therefrom is not in a clean shutdown state (i.e., transaction logs exist that are not committed to the database). Moreover, with MICROSOFT EXCHANGE databases, for instance, data in a dirty shutdown state is evidenced by a particular bit value and prevents standard APIs from accessing the data.

The features of the systems and methods will now be described with reference to the drawings summarized above. Throughout the drawings, reference numbers are re-used to indicate correspondence between referenced elements. The drawings, associated descriptions, and specific implementation are provided to illustrate embodiments of the invention and not to limit the scope of the disclosure.

In addition, methods and processes described herein are not limited to any particular sequence, and the blocks or states relating thereto can be performed in other sequences that are appropriate. For example, described blocks or states may be performed in an order other than that specifically disclosed, or multiple blocks or states may be combined in a single block or state.

Moreover, certain embodiments of the invention described herein can utilize one or more intelligent data replication processes and/or components that replicate application-specific data from a source system to a destination system. Certain examples of such processes and components are described in U.S. patent application Ser. No. 11/640,826, filed Dec. 18, 2006, published as U.S. Patent Application Publication No. 2007-0185938 A1, and issued as U.S. Pat. No. 7,651,593, which is hereby incorporated herein by reference in its entirety to be considered part of this specification.

FIG. 1 illustrates a block diagram of a database replication system 100 according to certain embodiments of the invention. As shown, the replication system 100 comprises a source system 102 capable of communicating with a target system 104 by sending and/or receiving data over a network 106. For instance, in certain embodiments, the target system 104 receives and/or stores a replicated copy of at least a portion of data, such as application-specific data, associated with the source system 102.

In certain embodiments, the source system 102 comprises one or more computing devices capable of processing data and can include, for example, a server computer, a workstation, a personal computer, a cell phone, a portable computing device, a handheld computing device, a personal digital assistant (PDA) or the like.

The illustrated network 106 advantageously comprises any means for communicating data between two or more systems or components. It certain embodiments, the network 106 comprises a computer network. For example, the network 106 may comprise a public network such as the Internet, virtual private network (VPN), token ring or TCP/IP based network, wide area network (WAN), local area network (LAN), an intranet network, point-to-point link, a wireless network, cellular network, wireless data transmission system, two-way cable system, interactive kiosk network, satellite network, broadband network, baseband network, combinations of the same or the like. In embodiments wherein the source system 102 and target system 104 are part of the same computing device, the network 106 may represent a communications socket or other suitable internal data transfer path or mechanism.

As shown, the source system 102 comprises one or more applications 108 residing on and/or being executed by a computing device. For instance, the applications 108 may comprise software applications that interact with a user to process data and may include, for example, database applications (e.g., SQL applications), word processors, spreadsheets, financial applications, management applications, e-commerce applications, browsers, combinations of the same or the like.

The source system 102 further comprises one or more processes, such as filter drivers 110, that interact with data (e.g., production data) associated with the applications 108. For instance, the filter driver 110 can comprise a file system filter driver, an operating system driver, a filtering program, a data trapping program, an application, a module of the application(s) 108, an API, or other like software module or process that, among other things, monitors and/or intercepts particular application requests targeted at a database, a file system, another file system filter driver, a network attached storage ("NAS"), a storage area network ("SAN"), mass storage and/or other memory or raw data. In some embodiments, the filter driver 110 may reside in the I/O stack of the application 108 and may intercept, analyze and/or copy certain data traveling from the application 108 to storage.

In certain embodiments, the filter driver 110 can intercept data modification operations that include changes, updates and new information (e.g., data writes) with respect to the application(s) 108 of interest. For example, the filter driver 110 may locate, monitor and/or process one or more of the following with respect to a particular application 108, application type or group of applications: data management operations (e.g., data write operations, file attribute modifications), logs or journals (e.g., NTFS change journal), configuration files, file settings, control files, other files used by the application 108, combinations of the same or the like. In certain embodiments, such data may also be gathered from files across multiple storage systems within the source system 102. Furthermore, the filter driver 110 may be configured to monitor changes to particular files, such as files identified as being associated with data of the applications 108.

In certain embodiments, multiple filter drivers 110 may be deployed on the source system 102, each filter driver 110 being dedicated to data of a particular application 108. In such embodiments, not all information associated with the source system 102 may be captured by the filter drivers 110 and, thus, the impact on system performance may be reduced. In other embodiments, the filter driver 110 may be suitable for use with multiple application types and/or may be adaptable or configurable for use with multiple applications 108.

The illustrated source system 102 further comprises one or more source storage devices 120. In certain embodiments, the source storage device(s) 120 are configured to store production data associated with one or more of the applications 108. The source storage device 120 may include any type of media capable of storing data. For example, the source storage device 120 may comprise magnetic storage (such as a disk or a tape drive) or other type of mass storage. In certain embodiments, the source storage device 120 may be internal and/or external to (e.g., remote to) the computing device(s) having the applications 108 and the filter drivers 110.

As illustrated in FIG. 1, the source storage devices 120 further comprise at least one database 122 and transaction log files 124. In particular, the transaction log files 124 can comprise a set of changes, such as, for example, insertions, deletions and updates received from the application(s) 108 that are to be applied to the data in the database 122.

In certain embodiments, the transaction log files 124 are stored on at least one dedicated disk so that the logs are not affected by any disk failures that can potentially corrupt the database 122. For instance, the transaction log files 124 can be stored on a high-performance disk while the database 122 is stored on one or more slower disks. In other embodiments, the transaction log files 124 and the database 122 can be maintained on the same storage medium.

As further illustrated in FIG. 1, the target system 104 comprises a replication module 128 that communicates with one or more target storage devices 130. In certain embodiments, the target system 104 comprises any computing device capable of processing data and includes, for example, a server computer, a workstation, a personal computer or the like.

In certain embodiments, the replication module 128 is configured to monitor and/or manage the copying of data from the source system 102 to the target system 104, such as data obtained by the filter drivers 110. For example, the replication module can receive one or more log files or entries, data transactions, or other like replication data indicative of the data transactions or operations being generated by the application 108 to modify data stored on the source storage device(s) 120. In yet other embodiments, the replication module 128 is a "dumb" server or terminal that receives and executes instructions from the source system 102.

The target storage device(s) 130 may include any type of media capable of storing data, such as replication data sent from the source system 102. For example, the target storage device 130 may comprise magnetic storage (such as a disk or a tape drive) or other type of mass storage. In certain embodiments, the target storage device 130 may be internal and/or external to the computing device(s) having the replication module 128.

In certain embodiments, the source storage device 120 and/or the target storage device 130 may be implemented as one or more storage "volumes" that include physical storage disks defining an overall logical arrangement of storage space. For instance, disks within a particular volume may be organized as one or more groups of redundant array of independent (or inexpensive) disks (RAID). In certain embodiments, either or both of the storage devices 120, 130 can include multiple storage devices of the same or different media.

As shown in FIG. 1, the target storage device(s) 130 at least comprise a database 132 and transaction log files 134. In particular, the target database 132 is generally synchronized with the source database 122. Likewise, the target transaction log files 134 can comprise a replication of those log files present in the transaction log files 124 of the source storage device 120. As discussed above, in certain embodiments, the database 132 and the transaction log files 134 are advantageously maintained on separate media such that the transaction log files 134 can be stored on a relatively high-performance storage medium. In yet other embodiments, the database 132 and transaction log files 134 are stored in different volumes of the same disk.

As further shown, the replication system 100 is structured to generate read-only copies 136 of the replicated data stored in the target storage device(s) 130. For instance, such copies 136 can be generated according to one or more schedules, storage policies (e.g., user- or system-defined), or the like. In certain embodiments, the replication module 128 coordinates the generation of the copies 136. For example, the replication module 128 can comprise a data agent module executing on the replication system 100 that manages read-only copies (e.g., snapshots) of the replicated data. In yet other embodiments, a storage manager, a stand-alone application, or the like, manages the generation of the read-only copies 136.

In certain embodiments, the read-only copies 136 advantageously comprise a plurality of snapshots. For instance, the snapshots can reflect point-in-time copies of the database data. In certain embodiments, the snapshots allow for access to and/or manipulation of database data without affecting the production data on the source storage device(s) 120. Moreover, in certain embodiments, the snapshots record database data in a clean shutdown mode and allow for offline access of the data without the need for the native database application 108.

In certain embodiments, the source system 102 communicates with the associated target system 104 to verify that the two systems are synchronized. For instance, the source system 102 may receive from the target system 104 an identification (e.g., unique serial number) of a transaction log last committed by the target system 104. The source system 102 may then compare the received identification with state of the data in the source storage device(s) 120.

Figure 2:
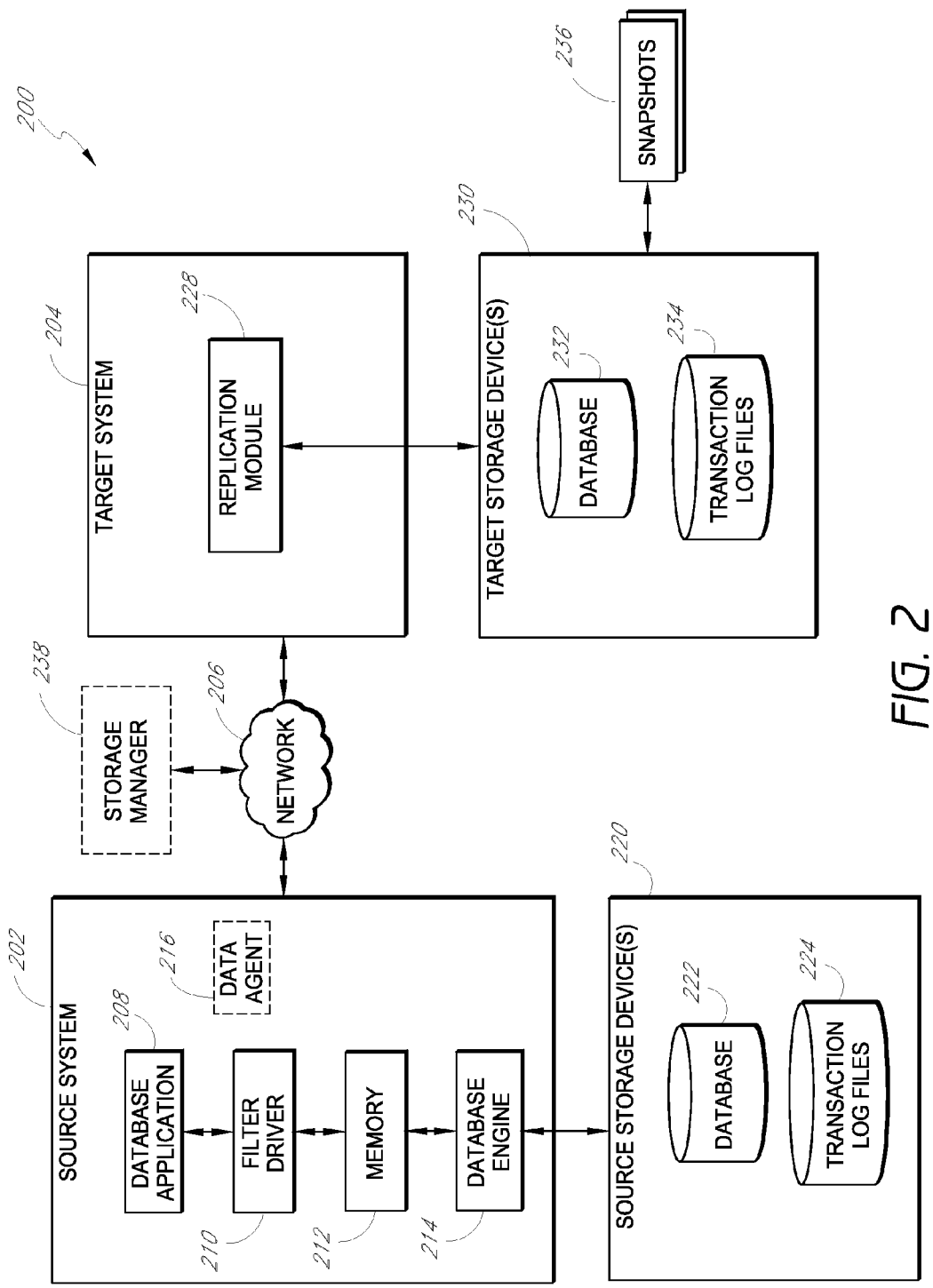
FIG. 2 illustrates a block diagram of an exemplary embodiment of a database replication system configured to provide a snapshot of data in a clean shutdown state.

FIG. 2 illustrates further details of a replication system 200 in accordance with certain embodiments of the invention. In particular, FIG. 2 illustrates additional details of an embodiment of the replication system 100 of FIG. 1. Thus, for ease of reference and description, elements of the replication system 200 of FIG. 2 will not be redescribed in detail if they were described above. Rather, the elements in the embodiment of FIG. 2 will be given a reference numeral that retains the same last two digits as the reference numeral used in the embodiment of FIG. 1, and the last two digits will be preceded with a numeral "2." Thus, the replication system 200 generally corresponds to the replication system 100 with certain differences that will be illuminated in the following discussion.

As shown, the replication system 200 comprises a source system 202 that communicates with a target system 204 via a network 206. In particular, the target system 204 is structured to replicate database data originating from and/or stored by the source system 202.

The illustrated source system 202 comprises a database application 208 that interacts with one or more users or programs to generate production data. For instance, the database application 208 can comprise one or more applications that require transactions to be played or committed in order for the data of the application 208 to be at consistent point or state.

For exemplary purposes, the database application 208 will often be described hereinafter with reference to a MICROSOFT EXCHANGE environment. In yet other embodiments, other types of database applications and/or collaboration applications can be used, such as, for example, ACTIVE DIRECTORY, ORACLE, other JET-based applications or the like.

With continued reference to the source system 202, a filter driver 210 tracks file changes being generated by the application 208. For example, the filter driver 210 can be configured to populate data relating to transactions of the database application 208 in source logs to be replicated to the target system 204.

In certain embodiments, the filter driver 210 may be deployed in the stack as an I/O buffer and/or process in the data path between the database application 208 and a memory 212. In such embodiments, the filter driver 210 may intercept, snoop, supervise, trap, process or otherwise be cognizant of some or all operations (e.g., data modification operations, file modification operations, read operations and the like) from the database application 208 to its associated location(s) on the source storage device(s) 220.

In embodiments of the invention having multiple database applications 208, multiple filter drivers 210 can be used such that each filter driver 210 corresponds to a single database application 208. In such embodiments, data relating to each database application 208 of interest can be written to a particular log file established for that application. In yet other embodiments, a single filter driver 210 can communicate with multiple database applications 208.

In certain embodiments, the transactions from the database application 208 are preferably stored in the memory 212 after or while being logged by the filter driver 210. A database engine 214 then commits the transactions stored in the memory 210 to disk (source storage device(s) 220).

The source storage device(s) 220 comprise one or more media for storing production data relating to the database application 208. As shown, the source storage device 220 includes a database or information store 222 for storing the committed transaction data from the database application 208. The source storage device(s) 220 further include transaction log files 224 that represent a sequence of files to keep a secure copy on disk of the data (e.g., uncommitted transaction logs) in the memory 212.

As described above with reference to FIG. 1, the replication system 200 is configured to replicate data, such as through a continuous data replication process, to target storage device(s) 230 of the target system 204. To facilitate and/or coordinate such replication, the target system 204 includes a replication module 228.

In certain embodiments, the replication module 228 comprises and/or communicates with one or more replay threads, processes or routines that populate data to the target storage device(s) 230 during the replication process. For instance, the replication module 228 can replay data from log files that are received from the source system 202. In certain embodiments, the target storage device(s) 230 comprise one or more databases 232 and transaction log files 234 that store a copy of the data residing in, respectively, the source database(s) 222 and the transaction log files 224.

The target system 204 is further configured to generate one or more snapshots 236 of data stored in the target storage device(s) 230. In certain embodiments, the snapshot 236 comprises a read-only copy of the data stored in the database 232 and the transaction log files 234, as discussed in more detail above.

In certain embodiments, the replication system 200 can optionally include one or more additional components for further coordinating and/or facilitating replication between the source system 202 and the target system 204. For instance, FIG. 2 further illustrates the source system 202 comprising an optional data agent 216.

In certain embodiments, the data agent 216 comprises a module responsible for performing data and/or storage tasks related to the source system 202. For example, the data agent 216 may manage and/or coordinate the compilation of and/or transferring of replication data from the source system 202. In other embodiments, the data agent 216 may provide archiving, migrating, and/or recovery of system data.

In certain embodiments, the source system 202 comprises a plurality of data agents 216, each of which performs data management operations related to data associated with each database application 208. In such embodiments, the data agent 216 may be aware of the various logs, files, folders, registry files and/or system resources that are impacted by a particular database application 208.

In certain embodiments, the data agent 216 is configured to perform data management operations in accordance with one or more "storage policies" or other preferences. In certain embodiments, a storage policy includes a data structure or other information having a set of preferences and/or other storage criteria for performing a storage operation. The preferences and storage criteria may include, but are not limited to, information regarding storage locations and/or timing, relationships between system components, network pathways, retention policies, data characteristics, compression or encryption requirements, preferred system components, combinations of the same or the like.

In certain further embodiments, the replication system 200 can optionally include a storage manager 238 that communicates with the source system 202 and the target system 204. In certain embodiments, the storage manager 238 directs the performance of one or more storage operations and, in particular, the replication of data from the source system 202 to the target system 204. In further embodiments, the storage manager 238 may perform one or more of the operations or functions described above with respect to the data agent 216 and/or the replication module 228. For instance, the storage manager 238 may direct and/or coordinate the performance of one or more storage operations on the replicated data (e.g., snapshots of the replicated data) of the target storage device(s) 230.

In certain embodiments, the storage manager 238 maintains an index (not shown), such as a cache, for storing information relating to: logical relationships and associations between components of the replication system 200, user preferences, management tasks, and/or other useful data. For example, the storage manager 238 may use its index to track the location and timestamps of one or more snapshots of the replicated data.

The storage manager 238 may also use its index to track the status of data management operations to be performed, storage patterns associated with the system components such as media use, storage growth, network bandwidth, Service Level Agreement ("SLA") compliance levels, data protection levels, storage policy information, storage criteria associated with user preferences, retention criteria, storage operation preferences, and/or other storage-related information. The index may typically reside on the storage manager's hard disk and/or other database.

In certain embodiments, the storage manager 238 further communicates with a database (not shown) for storing system management information relating to the replication of data. For instance, the storage manager database may be configured to store storage and/or restore policies, user preferences, the status or location of system components or data, combinations of the same and the like. In yet other embodiments, the storage manager database may be configured to store information described above with respect to the storage manager index. In yet other embodiments, at least a portion of the storage manager index may be stored on the storage manager database.

In other embodiments, the storage manager 238 may alert the user or system when a particular resource of the replication system 200 is unavailable or congested or when components are unavailable due to hardware failure, software problems, or other reasons. In certain embodiments, the storage manager 238 may utilize replication system data to suggest solutions to such problems when they occur or even before they occur. For example, the storage manager 238 might alert the user that a storage device in the target system 204 is full or otherwise congested, and then suggest, based on job and data storage information contained in its index cache, an alternate storage device. In yet further embodiments, the storage manager 238 or other system component may take action to remedy the problem at issue. For example, the storage manager 238 may perform load balancing, error correction, or the like, based on information received regarding the target system 204.

In certain embodiments, the storage manager 238 may include other components and/or modules. For example, the storage manager 238 may include a jobs agent module (not shown) that monitors the status of storage operations that have been performed, that are being performed, or that are scheduled to be performed in the replication system 200.

Moreover, the storage manager 238 may include an interface agent module (not shown). In certain embodiments, the interface agent module may provide presentation logic, such as a graphical user interface ("GUI"), an API, or other interface by which users and system processes may be able to retrieve information about the status of storage operations and issue instructions to the replication system 200 regarding the performance of storage operations. For example, a user may modify the schedule of a number of pending snapshot copies or other types of copies. As another example, a user may use the GUI to view the status of all storage operations currently pending in the replication system 200 or the status of particular components in the replication system 200.

Additional details of storage manager modules useful with embodiments of the replication systems 100, 200 described herein are disclosed in U.S. patent application Ser. No. 09/354,063, filed Jul. 15, 1999, now U.S. Pat. No. 7,389,311, which is hereby incorporated herein by reference in its entirety.

Figure 3:
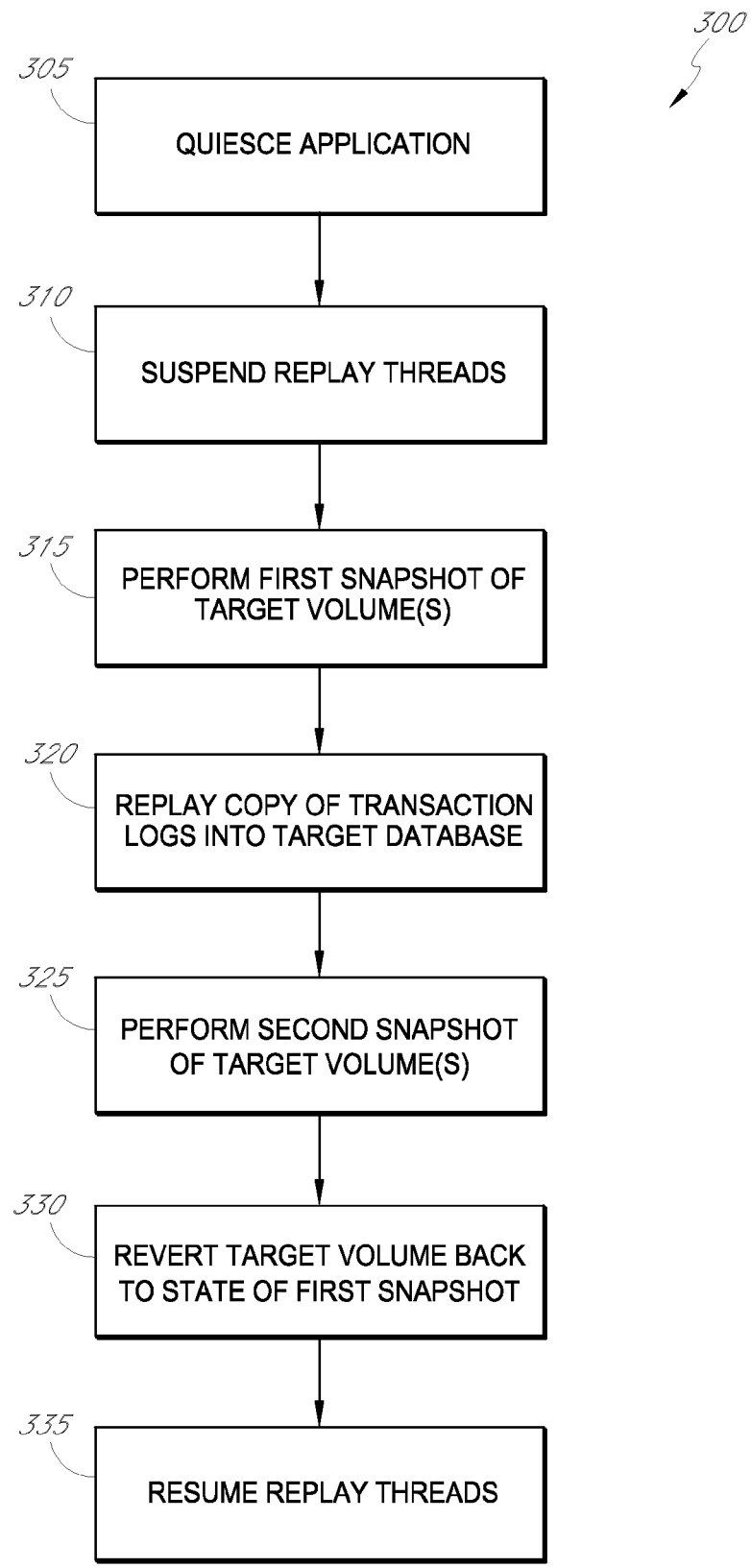
FIG. 3 illustrates a flowchart of an exemplary embodiment of a database replication process usable by the database replication systems of FIGS. 1 and 2.

FIG. 3 illustrates a flowchart of an exemplary embodiment of a database replication process 300. In certain embodiments, the process 300 creates a crash consistent copy of database data in a clean shutdown state such that the data can be read or otherwise utilized without needing the native database application or its accompanying APIs. In certain embodiments, the replication process 300 can be performed by the database replication systems 100, 200 of FIGS. 1 and 2. For exemplary purposes, the replication process 300 will be described hereinafter with respect to the components of the replication system 200 of FIG. 2.

The replication process 300 begins at Block 305, wherein the database application 208 is quiesced. For example, in certain embodiments, the Volume Shadow Copy Service (VSS) offered by MICROSOFT can be used to temporarily quiesce write requests from the database application 208, such as MICROSOFT EXCHANGE, to the source storage device 220. For instance, in such embodiments, the data agent 216 can insert a marker in the application data (e.g., transaction logs) that indicates the data is in a recoverable (e.g., crash consistent, stable) state.

At Block 310, the replication module 228 suspends the replay threads on the target system 204 that are replicating the data to the target storage device 230. In certain embodiments, such suspension occurs based on the threads' detection of the markers inserted by the VSS service. At this point, the target storage device(s) 230 and the source storage device(s) 220 are preferably synchronized and/or include data that is in a crash recoverable state, although the data is not in a "clean shutdown" state.

With the replay threads suspended, the replication module 228 initiates a first snapshot of the target volume, including the database 232 and the transaction log files 234 (Block 315). In certain embodiments, the first snapshot includes a read-only copy of the database application data in a recoverable state. However, as discussed above, this data is generally not in a clean shutdown state and does not allow for access of the data without the use of the native application (e.g., MICROSOFT EXCHANGE) to interpret the data.

At Block 320, the copy of the uncommitted transaction logs stored in the target transaction log files 234 is replayed into the target database 232. In certain embodiments, such replaying is performed through the execution of one or more JET APIs. After this point, the copy of the database application 208 data in the target database 232 is advantageously in a clean shutdown state since the pending transaction logs have been committed. That is, the copy of the data in the database 232 is in a state that can be read offline without the use of the native database application 208.

At Block 325, the replication module 228 initiates a second snapshot of the target volume. Because the target transaction logs have been replayed into the target database 232, the second snapshot advantageously comprises a read-only copy of application data in both a recoverable and clean shutdown state.

However, with the replaying of the copy of the transaction logs at Block 320, the data on the target storage device(s) 230 becomes out of sync with the production data stored on the source storage device(s) 220. Thus, prior to resuming replication between the source storage device(s) 220 and the target storage device(s) 230, the replication process 300 reverts the target volume back to the state of the first snapshot (Block 330). In certain embodiments, this revert process is performed by taking a difference (e.g., file changes that have been cached) of the first and second snapshots, as is discussed in more detail with respect to FIG. 4.

Following Block 330, the replication module 228 thaws the replay threads and allows the replication between the source and target storage devices 220, 230 to resume (Block 335).

Although the database replication process 300 has been described with reference to a particular arrangement, other embodiments of the invention can include more, fewer or different blocks or states. For instance, in other embodiments, instead of snapshots, other types of read-only copies can be performed on the data in the target storage device(s) 230.

In yet other embodiments, at Block 305, the data agent 216 and/or the filter driver 210 can be advantageously configured to pause, or quiesce, the database application 208 during data replication. For instance, the data agent 216 may cause the application 208 to temporarily suspend data management operations to the source storage device 220 once the application 208 reaches a known "good," "stable" or "recoverable" state.

In certain embodiments, the data agent 216 instructs the quiescing of the application 208 through an application programming interface (API). When the application 208 has placed itself in a known good state, the application 208 may send an acknowledgment to the data agent 216.

In certain embodiments, once the data management operations are suspended, the filter driver 210 and/or data agent 216 then inserts a logical marker or tag in the source log file denoting that a "consistency point" or "consistency recovery point" has been reached. In some embodiments, the consistency point indicates the time at which the application 208 is at a known good state.

Moreover, in certain embodiments, the target system 204 is further capable of performing one or more data management operations, such as, for example, storage operations (e.g., backup), search operations, data classification, combinations of the same or the like on the replicated data at certain consistency points. Performing data management operations on the replicated data allows for the processing of copies of application data without significantly impacting the resources of the source system. Furthermore, when copying the replicated data at consistency points, the copied data presumably represents a known good state of the application.

In certain embodiments of the invention, at Block 305 the application 208 is periodically quiesced based on particular criteria. For instance, the quiescing of the application 208 may be based on one or more system- or user-defined preferences (e.g., every five minutes). The periodic quiescing of the application 208 may be based on the desired frequency of performing replication, backup or other data modification operations on the subject data. For instance, applications 208 dealing with data-sensitive information may necessitate more frequent quiescing (and creation of consistency points) than other types of applications.

In yet other embodiments, quiescing of the application 108 may be performed based on an automatic reporting procedure. For instance, a module of the replication system 200 may be configured to gather, receive and/or analyze information associated with a failure rate and/or health of applicable servers. Additional details of such status monitoring are provided in U.S. patent application Ser. No. 11/120,619, filed May 2, 2005, now published as U.S. Patent Application Publication No. 2006-0053261 A1, and issued as U.S. Pat. No. 7,343,453, which is hereby incorporated herein by reference in its entirety.

Figure 4:
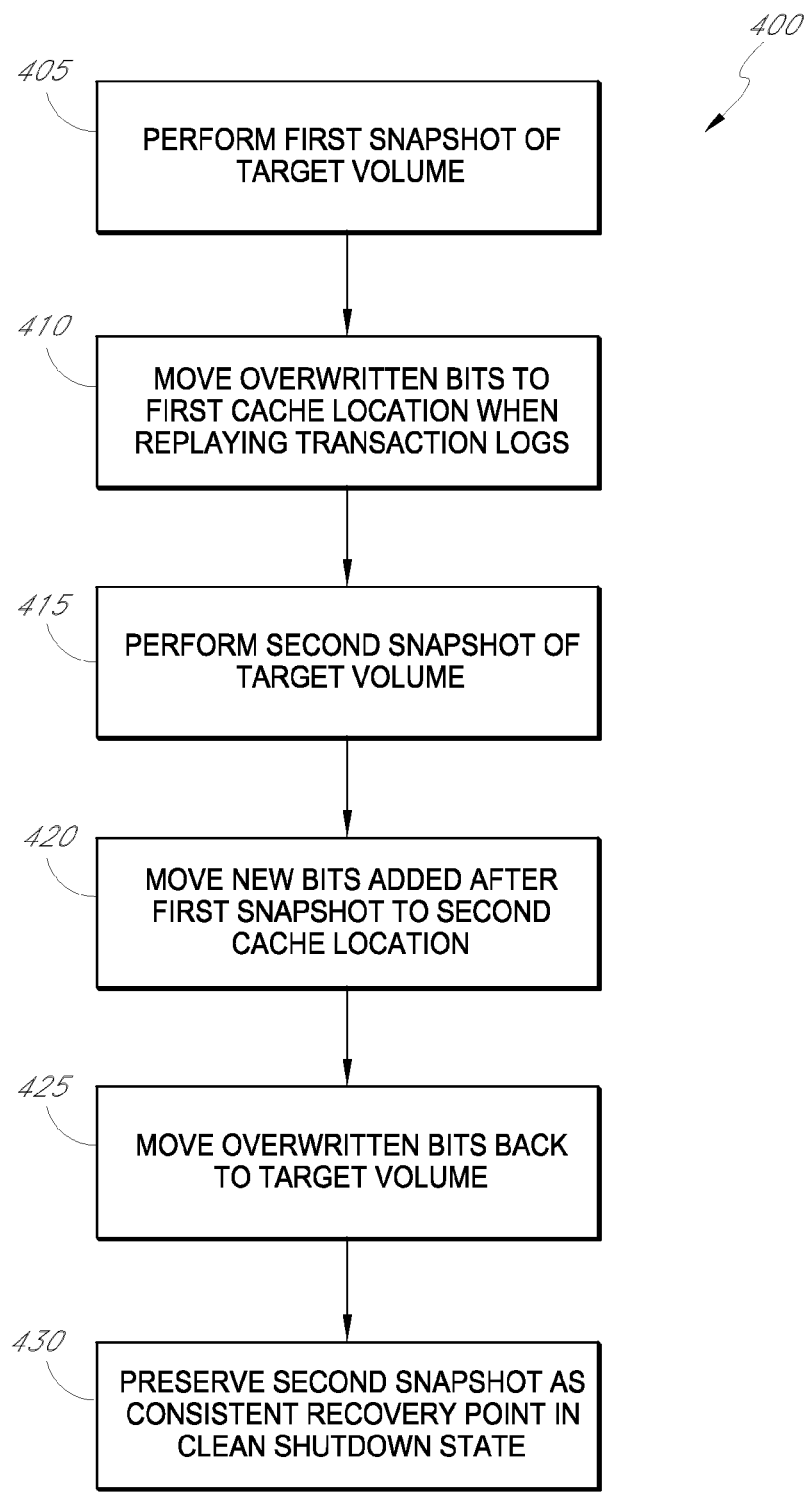
FIG. 4 illustrates a flowchart of an exemplary embodiment of a double snapshot process of the data replication process of FIG. 3.

FIG. 4 illustrates a flowchart of an exemplary embodiment of a double snapshot process 400 that may be used when performing certain blocks (e.g., Blocks 315 to 330) of the data replication process 300 of FIG. 3. For exemplary purposes, the double snapshot process 400 will be described hereinafter with respect to the components of the replication system 200 of FIG. 2.

At Block 405, the process 400 performs a first snapshot of the target volume, including the target database 232 and the target transaction log files 234. Following the first snapshot, the transaction logs are replayed into the target database 232 to put the copy of the data in a clean shutdown state. During the replay of the transaction logs (e.g., by a JET API), the overwritten bits in the target database 232 can be moved to a first cache location (Block 410).

The process 400 then performs a second snapshot of the target volume, wherein the target volume represents the application data in a clean shutdown state (Block 415). Following the second snapshot, the process 400 reverts the target volume back to the state in which it existed at the time of the first snapshot. To do so, at Block 420, the new bits added between the first and second snapshots (i.e., during the replaying of the transaction logs) are moved to a second cache location (Block 425). The overwritten bits stored in the first cache location are then moved back to the target volume (Block 425).

At Block 430, the second snapshot is preserved as a consistent recovery point in a clean shutdown state. In certain embodiments, a customized driver is used to preserve the snapshot (e.g., the snapshot is not deleted).

In certain embodiments, the first and second cache locations can be on different storage devices or volumes. In yet other embodiments, the first and second cache locations can be located on the same storage device.

Figure 5:
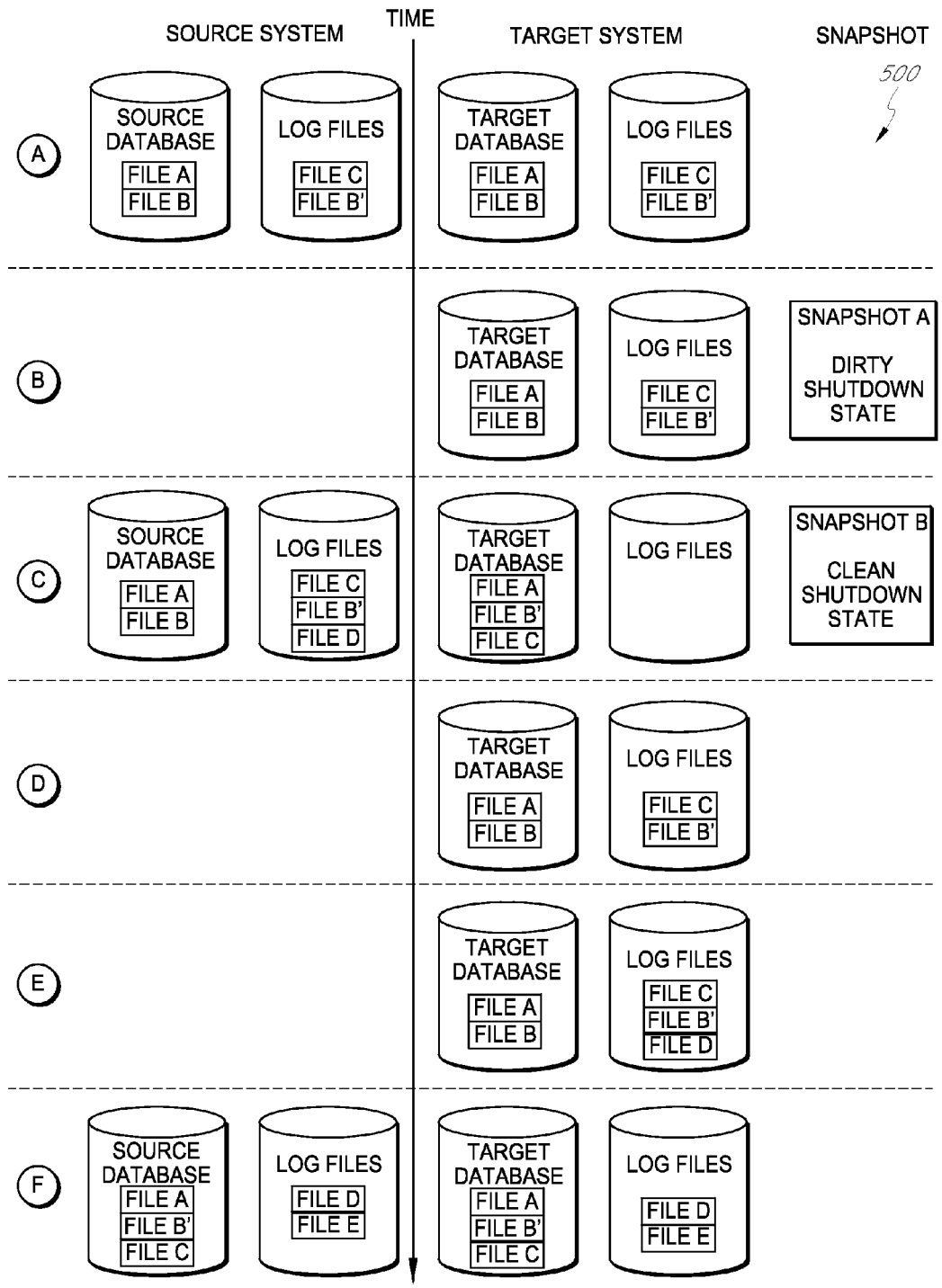
FIG. 5 illustrates a timeline of states of data during the database replication process of FIG. 3, according to certain embodiments of the invention.

FIG. 5 illustrates an exemplary timeline 500 of states of data during the database replication process 300 of FIG. 3, according to certain embodiments of the invention. In particular, the timeline 500 includes a simplified representation of the states of files on a source system (e.g., source storage device 220) and a target system (e.g., target storage device 230) during replication.

As shown, at State A, the source database includes File A and File B and the source log files include a transaction relating to the creation of File C and the modification of File B (i.e., File B'). With reference to the target system, the target database and the target log files are synchronized with the source system.

At State B, a first snapshot (i.e., Snapshot A) is taken of the target system. As discussed above with reference to Block 315 of the replication process 300, the application data from the target database is in a dirty shutdown state.

At State C, an additional transaction log for the creation of a File D has been added to the source log files. Moreover, the target transaction logs (Files B' and C) have been replayed from the target log files to the target database (see, e.g., Block 320). Thus, the target database includes File A, File B' and File C. At this point, the data in the target database is in a clean shutdown state, and no outstanding transaction logs are left in the target log files. As further illustrated, the system then takes a second snapshot (Snapshot B) of at least the data in the target database to create a consistent, recoverable copy of the database application data that can be accessed and utilized without the native database application which created the data (see, e.g., Block 325).

At State D, the target database is reverted back to the state in which it existed at the time Snapshot A was taken (see, e.g., Block 330), and the target log files are repopulated with transactions relating to Files B' and C. Moreover, at State E, a transaction log relating to File D is replicated from the source system to the target system.

At State F, the transaction logs in both the source and target log files relating to File B' and File C are replayed, respectively, into the source and target databases. Moreover, an additional transaction log relating to File E is added to the source log files and replicated to the target system such that the source and target systems are re-synchronized.

In certain embodiments of the invention, data replication systems and methods disclosed herein may be used in a modular storage management system, embodiments of which are described in more detail in U.S. Pat. No. 7,035,880, issued Apr. 5, 2006, which is hereby incorporated herein by reference in its entirety. For example, the data replication system may be part of a storage operation cell that includes combinations of hardware and/or software components directed to performing storage operations on electronic data. Exemplary storage operation cells usable with embodiments of the invention include CommCells as embodied in the QNet storage management system and the QiNetix storage management system by CommVault Systems, Inc. (Oceanport, N.J.), and as further described in U.S. patent application Ser. No. 10/877,831, filed Jun. 25, 2004, now published as U.S. Patent Application Publication No. 2005-0033800 A1, issued as U.S. Pat. No. 7,454,569, which is hereby incorporated herein by reference in its entirety.

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein.

Embodiments of the invention are also described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the acts specified in the flowchart and/or block diagram block or blocks.

These computer program instructions may also be stored in a computer-readable memory that can direct a computer or other programmable data processing apparatus to operate in a particular manner, such that the instructions stored in the computer-readable memory produce an article of manufacture including instruction means which implement the acts specified in the flowchart and/or block diagram block or blocks. The computer program instructions may also be loaded onto a computer or other programmable data processing apparatus to cause a series of operations to be performed on the computer or other programmable apparatus to produce a computer implemented process such that the instructions which execute on the computer or other programmable apparatus provide steps for implementing the acts specified in the flowchart and/or block diagram block or blocks.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A system for performing data management operations in a computer network environment, the system comprising:
a target computer comprising computer hardware, the target computer coupled to a source computer, wherein the source computer has a native database application executing thereon and is coupled to at least one first storage device storing a source database including data generated by the native database application;
at least one second storage device coupled to the target computer, wherein the target computer is configured to:
generate a target database on the second storage device, the target database including a replicated version of at least some of the data in the source database;
perform a first copy operation to generate a first copy of at least a portion of the target database, wherein performing the first copy operation puts the target database into an unclean shutdown state;
subsequent to the first copy operation, commit a plurality of data transactions into the target database, the plurality of data transactions generated by the native database application and represented by a plurality of corresponding log entries, wherein the committing of the plurality of data transactions into the target database occurs prior to the plurality of data transactions being committed into the source database, wherein the data in the source database and the data in the target database are out of sync following the committing of the plurality of data transactions into the target database, and wherein the committing of the plurality of data transactions into the target database puts the target database into a clean shutdown state;
subsequent to the committing of the plurality of data transactions into the target database, perform a second copy operation to generate a second copy of at least a portion of the target database which includes data corresponding to the plurality of committed data transactions, wherein the second copy is generated in the clean shutdown state; and
revert the target database back to the unclean shutdown state in which the target database existed at the time the first copy operation was performed,
wherein the clean shutdown state allows for offline access of the data in the respective target database or second copy without the need for the native database application, and
wherein the unclean shutdown state requires the native database application for offline access of the data in the respective target database or second copy.

2. The system of claim 1, wherein at least one of the plurality of log entries comprises a marker indicative of a time of a known good state of the native database application.

3. The system of claim 1, wherein the first copy operation and the second copy operation comprise point-in-time snapshot operations.

4. The system of claim 1, wherein the target computer further comprises a replication module having a plurality of threads configured to commit the plurality of data transactions.

5. The system of claim 1, wherein the target computer comprises at least one application programming interface configured to commit the plurality of data transactions represented by the log entries.

6. The system of claim 1, wherein a filter driver is configured to monitor data transactions generated by the native database application and generate the plurality of log entries.

7. The system of claim 1, wherein the second copy is a read-only copy of the target database.

8. The system of claim 1, wherein the generation of the target database occurs without shutting down the native database application.

9. The system of claim 1, wherein said first and second copies comprise point-in-time images.

10. A method for managing data in a database system, the method comprising:
storing log entries in one or more target storage devices, wherein said log entries represent uncommitted data transactions generated by a native database application and associated with a source database stored on at least one source storage device;
prior to the data transactions being committed on either of the source data base and the target database, generating a first copy of at least a portion of a target database stored on the one or more target storage devices, wherein generating the first copy puts the target database into an unclean shutdown state;
committing into the target database, subsequent to said generating the first copy, the data transactions represented by the log entries, wherein said committing into the target database occurs prior to the data transactions being committed into the source database, and wherein the data in the source database and the data in the target database are out of sync following said committing into the target database, and wherein said committing into the target database puts the target database into a clean shutdown state;
generating, subsequent to said committing into the target database, a second copy of at least a portion of the target database which includes data corresponding to the committed data transactions, wherein the second copy is generated in the clean shutdown state; and
reverting the target database back to the unclean shutdown state in which the target database existed at the time of said generating the first copy,
wherein the clean shutdown state allows for offline access of the data in the respective target database or second copy without the need for the native database application, and
wherein the unclean shutdown state requires the native database application for offline access of the data in the respective target database or second copy.

11. The method of claim 10, wherein said generating the first copy is performed based on a marker in one of the log entries indicating a known good state of the native database application.

12. The method of claim 11, further comprising:
quiescing the native database application at a time of the known good state of the native database application; and
inserting the marker in the one of the log entries.

13. The method of claim 10, wherein the log entries are transmitted between the at least one source storage device and the one or more target storage devices.

14. The method of claim 10, wherein the first copy and the second copy comprise point-in-time snapshot copies.

15. The method of claim 10, wherein said storing is performed without shutting down the native database application.

16. The method of claim 10, wherein said first and second copies comprise point-in-time images.

* * * * *